(12) United States Patent
Yamamoto et al.

(10) Patent No.: US 6,653,421 B1
(45) Date of Patent: Nov. 25, 2003

(54) PHOTOREFRACTIVE COMPOSITION

(75) Inventors: Michiharu Yamamoto, Carlsbad, CA (US); Seth R. Marder, Tucson, AZ (US); Bernard Kippelen, Tucson, AZ (US)

(73) Assignees: Nitto Denko Corporation, Osaka (JP); Arizona Board of Regents on behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 10/113,330

(22) Filed: Mar. 29, 2002

(51) Int. Cl.$^7$ ............................................. C08F 126/06
(52) U.S. Cl. ...................... 526/259; 526/257; 526/260; 526/263; 526/270; 526/280; 526/288; 526/298; 526/328.5
(58) Field of Search ................. 526/257, 259, 526/260, 263, 270, 288, 280, 298, 328.5

(56) References Cited

PUBLICATIONS

Park et al. Polymers for Advanced Technologies (2000), 11(7), 349–358.*
Hendrickx et al. Proceedings of SPIE (2000), 4104, 130–139.*
Hendrickx et al. Materials Science and Engineering (2001) C 18(1–2), 25–35.*
Lee et al. Polymeric Materials Science and Engineering (1997), 76, 314–315.*
Zhao et al. Chem. Mater. (1995), 7(6), 1237–42.*
Ewert et al. Proceedings of SPIE (1998), 3471, 134–141.*

* cited by examiner

*Primary Examiner*—Helen L. Pezzuto
(74) *Attorney, Agent, or Firm*—Knobbe Martens Olson & Bear, LLP

(57) ABSTRACT

A photorefractive compositions of the present invention includes a copolymer component that provides both photoconductive (charge transport) ability and non-linear optical ability, and optionally sensitizer and plasticizer components. Both of the photoconductive and non-linear optical components are incorporated into the chemical structure of the copolymer itself, typically as side groups. Furthermore, the composition includes a copolymer component that provides photoconductive (charge transport) ability, non-linear optical ability, and plasticizer ability, optionally, sensitizer and plasticizer components.

28 Claims, No Drawings

PHOTOREFRACTIVE COMPOSITION

FIELD OF THE INVENTION

The invention relates to photorefractive compositions. More particularly, the invention relates to copolymers that include functional groups which provide photorefractive capabilities.

BACKGROUND OF THE INVENTION

Photorefractivity is a phenomenon in which the refractive index of a material can be altered by changing the electric field within the material, such as by laser beam irradiation. The change of the refractive index is achieved by a series of steps, including: (1) charge generation by laser irradiation, (2) charge transport, resulting in the separation of positive and negative charges, and (3) trapping of one type of charge (charge delocalization), (4) formation of a non-uniform internal electric field (space-charge field) as a result of charge delocalization, and (5) refractive index change induced by the non-uniform electric field.

Therefore, good photorefractive properties can be seen only for materials that combine good charge generation, good charge transport or photoconductivity, and good electro-optical activity.

Photorefractive materials have many promising applications, such as high-density optical data storage, dynamic holography, optical image processing, phase conjugated mirrors, optical computing, parallel optical logic, and pattern recognition.

Originally, the photorefractive effect was found in a variety of inorganic electro-optical (EO) crystals, such as LiNbO$_3$. In these materials, the mechanism of the refractive index modulation by the internal space-charge field is based on a linear electro-optical effect.

In 1990 and 1991, the first organic photorefractive crystal and polymeric photorefractive materials were discovered and reported. Such materials are disclosed, for example, in U.S. Pat. No. 5,064,264, to Ducharme et al. Organic photorefractive materials offer many advantages over the original inorganic photorefractive crystals, such as large optical nonlinearities, low dielectric constants, low cost, lightweight, structural flexibility, and ease of device fabrication. Other important characteristics that may be desirable depending on the application include sufficiently long shelf life, optical quality, and thermal stability. These kinds of active organic polymers are emerging as key materials for advanced information and telecommunication technology.

In recent years, efforts have been made to optimize the properties of organic, and particularly polymeric, photorefractive materials. As mentioned above, good photorefractive properties depend upon good charge generation, good charge transport, also known as photoconductivity, and good electro-optical activity. Various studies that examine the selection and combination of the components that give rise to each of these features have been done. The photoconductive capability is frequently provided by incorporating materials containing carbazole groups. Phenyl amine groups can also be used for the charge transport part of the material.

Non-linear optical ability is generally provided by including chromophore compounds, such as an azo-type dye, which can absorb photon radiation. The chromophore may also provide adequate charge generation. Alternatively, a material known as a sensitizer may be added to provide or boost the mobile charge required for photorefractivity to occur. Many materials, including a wide range of dyes and pigments, can serve as sensitizers.

The photorefractive composition may be made simply by mixing the molecular components that provide the individual properties required into a host polymer matrix. However, most compositions prepared in this way are not stable over time, because phase separation tends to occur as the components crystallize.

Efforts have been made, therefore, to make polymers that include one or more of the active components in the polymer structure.

An example of a polymer matrix that includes transport components is poly(n-vinylcarbazole) (PVK). With such a matrix, polymers with: high performance could be fabricated as reported by N. Peyghambarian et al. (*Nature*, 1994, 371, 497).

In this case, a, photorefractive composition was made by adding an azo dye (DMNPAA; 2,5-dimethyl-4-(p-nitrophenylazo) anisole) as chromophore, and trinitrofluorenone (TNF) as sensitizer. The resulting compositions showed almost 100% diffraction efficiency at laser intensity of 1W/cm$^2$ and 90 V/$\mu$m biased voltage. However, the response time was slow at over 100 msec.

To achieve good photorefractivity, however, such materials must be doped with large concentrations of chromophore, such as 25 wt % or more. Thus, crystallization and phase separation of the strongly dipolar chromophore remain a major problem.

To completely eliminate the instability caused by phase separation, it has been recognized that it would be desirable to prepare fully functionalised photorefractive polymers, that is, polymers in which both the photoconductivity and the non-minear optical capability reside within the polymer itself.

Building on the original University of Arizona work, efforts have been made to develop fully functional photorefractive polymers, as well as to speed up the response time. For example, PVK polymers in which some of the carbazole groups are tricyanovinylated have been made (N. Peyghambarian et al., *Applied Phys. Lett.*, 1992, 60, 1803). However, the photoconductivity of this polymer was reported as only 0.98 pS/cm and the diffraction efficiency was less than 1%, too low to show good photorefractivity. Subsequently, the same group has reported PVK-based materials with an amazing response time of 4 msec. (N. Peyghambarian et al., *Applied Physics Leiters*, 1999, 16, 2253).

A number of efforts at materials improvement have used methacrylate-based polymers and copolymers that include photoconductive and chromophore side groups. A paper by T. Kawakami and N. Sonoda, (*Applied Phys. Lett.*, 1993, 62, 2167.) discloses acrylate-based polymers containing dicyanovinylideneyl phenylamines as charge transport groups. The diffraction efficiency was reported at around 0.01%.

Japanese Patent Application Laid-open JP-A-1995-318992, to Hitachi Ltd. discloses acrylate-based polymers and copolymers made by conventional polymerization techniques and containing charge transport and non-linear-optical groups, but gives no photorefractive performance data.

A report by H. Sato et al., (Technical report of IEICE., 1995, OME-95-53, OPE95-94, 43) describes the preparation of several copolymers having both charge transport components and non-linear optical components in the side groups of the copolymer. However, the charge transport speeds seem to be too slow for good photorefractive materials.

Japanese Patent Application Laid-open JP-A 1998-333195, to Showa Denko, discloses acrylate-based polymers incorporating triphenylamine groups as charge transport agents. Fast response times (50 msec. at 70 V/$\mu$m biased voltage) is reported, although there is no description or data regarding diffraction efficiency.

A paper by Van Steenwickel et al. (*Macromolecules*, 2000, 33, 4074) describes acrylate-based polymers that include carbazole-based side chains and several stilbene-type side chains. The paper cites a high diffraction efficiency of 60% at 58 V/$\mu$m, but a slow-response time of the sub-second order.

A paper by Y.Chen et al. (*Modern Optics*, 1999, 46, 1003) discusses a methacrylate polymer that has both carbazole-type side chains to provide charge transport capability and nitrophenyl azo-type side chains to provide non-linear optical capability. The materials again show slow response times of over 20 sec.

None of the materials described above achieves the optimum combination of a high diffraction efficiency with a fast response time, long-term stability and easy processability. Thus, there remains a need for photorefractive compositions that combine these attributes.

In recent years, a new type of polymerization, termed living radical polymerization, has been developed for polymerization of functional monomers, including methacrylate and styrene derivatives. Living radical polymerization differs from conventional radical polymerization in that the polymer growth terminals can be temporarily protected by protection bonding. This enables polymerization to be well controlled, including being stopped and started at will.

This process can be used to prepare homopolymers and copolymers, including block copolymers. Details of the living radical polymerization method are described in prior literature. They may be found, for example, in the following papers:
1. T. Patten et al., "Radical polymerization yielding polymers with Mw/Mn~1.05 by homogeneous atom transfer radical polymerization", *Polymer Preprints*, 1996, 37, 575.
2. Matyjasewski et al., "Controlled/living radical polymerization. Halogen atom transfer radical polymerization promoted by a Cu(I)/Cu(II) redox process", *Macromolecules*, 1995, 28, 7901.
3. M. Sawamoto et al., "Ruthenium-mediated living radical polymerization of methyl methacrylate", *Macromolecules*, 1996, 29, 1070.

Living radical polymerization is also described in U.S. Pat. No. 5,763,548 to Carnegie-Mellon University, which is incorporated herein by reference in its entirety.

As an example of block copolymers prepared by living radical polymerization, novel styrene and butyl acrylate block copolymers for pressure sensitive adhesives have been reported (JP-A 2001-115124, M. Yamamoto et al.). Such block copolymers could not be prepared by conventional polymerization methods.

SUMMARY OF THE INVENTION

The object of the present invention is to provide a photorefractive composition which exhibits high photoconductivity, and a copolymer which is desirably used for the photorefractive composition.

A first aspect of the present invention is a composition comprising a co-polymer, wherein: (a) the co-polymer comprises a first repeating unit including a first moiety selected from the group consisting of the structures (i), (ii) and (iii), and a second repeating unit including a second moiety represented by the formula (0); wherein (b) the composition exhibits photorefractive ability:

Structure (i)

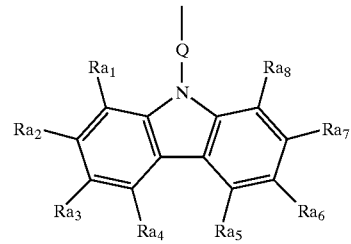

wherein Q represents an alkylene group, with or without a hetero atom, such as oxygen or sulfur, and preferably Q is an alkylene group represented by $(CH_2)p$; where p is between about 2 and 6; and wherein $Ra_1$, $Ra_2$, $Ra_3$, $Ra_4$, $Ra_5$, $Ra_6$, $Ra_7$, and $Ra_8$ are each independently selected from the group consisting of a hydrogen atom, a linear alkyl group with up to 10 carbons, a branched alkyl group with up to 10 carbons, and an aromatic group with up to 10 carbons;

Structure (ii)

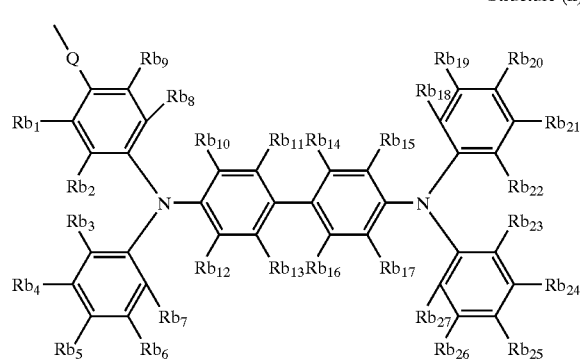

wherein Q represents an alkylene group, with or without a hetero atom, such as oxygen or sulfur, and preferably Q is an alkylene group represented by $(CH_2)p$; where p is between about 2 and 6; and wherein $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)

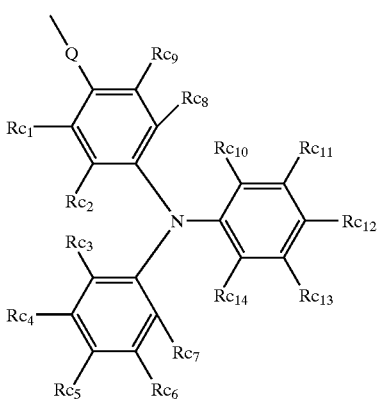

wherein Q represents an alkylene group, with or without a hetero atom, such as oxygen or sulfur, and preferably Q is an alkylene group represented by $(CH_2)p$; where p is between about 2 and 6, and wherein $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

Formula (0)

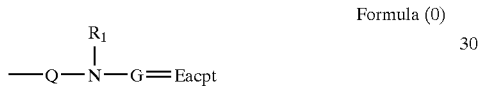

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

A second aspect of the present invention is a composition comprising a co-polymer prepared by radical polymerization, wherein: (a) the co-polymer comprises a first repeating unit selected from the group consisting of the structures (i)″, (ii)″ and (iii)″, and a second repeating unit represented by the formula (0)″; wherein (b) the composition exhibits photorefractive ability:

Structure (i)″

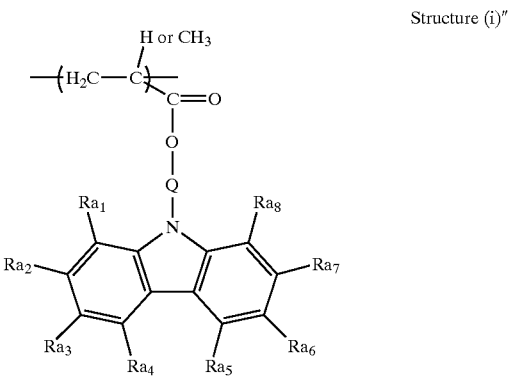

wherein Q represents an alkylene group, with or without a hetero atom, such as oxygen or sulfur, and preferably Q is an alkylene group represented by $(CH_2)p$; where p is between about 2 and 6; and wherein $Ra_1$, $Ra_2$, $Ra_3$, $Ra_4$, $Ra_5$, $Ra_6$, $Ra_7$, and $Ra_8$ are each independently selected from the group consisting of a hydrogen atom, a linear alkyl group with up to 10 carbons, a branched alkyl group with up to 10 carbons, and an aromatic group with up to 10 carbons;

Structure (ii)″

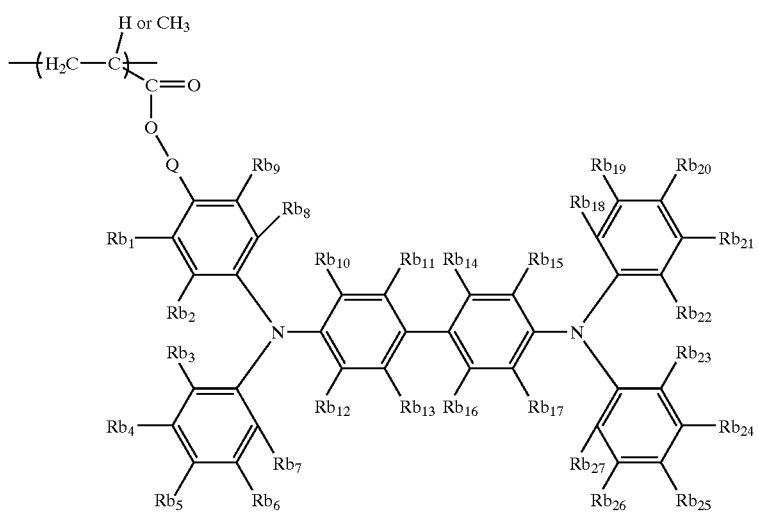

wherein Q represents an alkylene group, with or without a hetero atom, such as oxygen or sulfur, and preferably Q is an alkylene group represented by $(CH_2)p$; where p is between about 2 and 6; and wherein $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)″

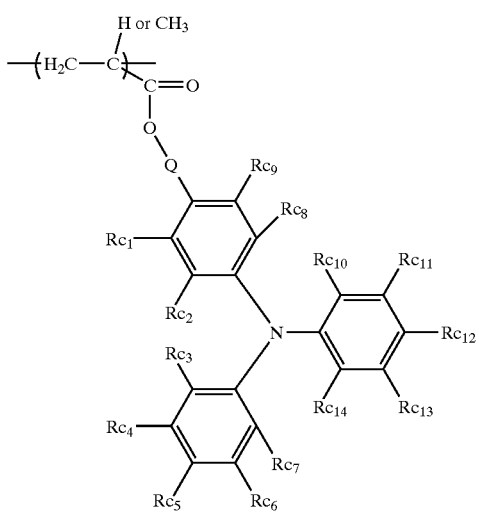

wherein Q represents an alkylene group, with or without a hetero atom, such as oxygen or sulfur, and preferably Q is an alkylene group represented by $(CH_2)p$; where p is between about 2 and 6, and wherein $Rc_1$–$Rc_{14}$ are each independently selected from the group consisting of a hydrogen atom, a linear alkyl group with up to 10 carbons, a branched alkyl group with up to 10 carbons; and an aromatic group with up to 10 carbons;

Formula (0)″

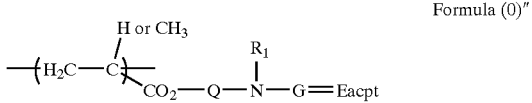

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

A third aspect of the present invention is a composition comprising a block co-polymer, wherein: (a) the block co-polymer comprises a first block unit including a first moiety selected from the group consisting of the above structures (i), (ii) and (iii), and a second block unit including a second moiety represented by the above formula (0); wherein (b) the composition exhibits photorefractive ability:

A fourth aspect of the present invention is a composition comprising a block co-polymer prepared by living radical, polymerization, wherein: (a) the block co-polymer comprises a first block unit having charge transport ability, and a second block unit having non-linear-optical ability; wherein (b) the composition exhibits photorefractive ability.

A fifth aspect of the present invention is a composition comprising a block co-polymer, wherein: (a) the block co-polymer comprises a first block unit containing a unit selected from the group consisting of the above structures (i)″, (ii)″ and (iii)″, and a second block unit containing a unit represented by the above formula (0)″; wherein (b) the composition exhibits photorefractive ability.

The composition comprises a polymer matrix, and includes a component that provides photoconductive (charge transport) ability and a component that provides non-linear optical ability, and, optionally, sensitizer and plasticizer components. Both of the photoconductive and non-linear optical components are incorporated into the chemical structure of the polymer itself, typically as side groups.

The composition differs from photorefractive compositions previously known in the art in several points.

In a first point, the composition provides fast response time compared with prior art photoconductive materials; and/or one or more other advantageous properties, such as high diffraction efficiency and high photoconductivity. Furthermore these properties can typically be provided in conjunction with one or more other desirable attributes, such as, comparatively low glass transition temperature, low viscosity, and excellent handling and processing capability.

In a second point, the composition comprises a random copolymer or a block copolymer incorporating blocks containing the photoconductive side group and blocks containing the chromophore side group. Random-type or block-type copolymers comprising two functional groups, a charge transport functional group and a non-linear optical functional group, are provided, and can be readily made by the processes of the invention.

In a third point, the composition comprises a copolymer which showed very good phase stability, that is, resistance to phase separation.

Both the random copolymers and the block copolymers disclosed herein provide the advantage of long-term stability, due to lower likelihood of phase separation or crystallization, compared with polymer materials in which the functionality is provided by adding functional materials in the form of dopants.

With respect to the first point of the invention, inventors have found, to inventors' surprise, that inventors' photorefractive compositions exhibit high response times, such as 50 ms or less.

With respect to the second point of the invention, inventors have developed photorefractive copolymers in the art. The copolymers of the invention can manifest essentially any combination of units having photoconductive ability and units having non-linear optical ability.

The copolymers of the invention can be readily made by adapted conventional radical polymerization techniques, such as by azo-type initiator system catalysis or by the adapted living radical polymerization techniques.

The block copolymers of the invention can manifest essentially any combination of blocks containing units with photoconductive ability and blocks containing units with non-linear optical ability. For example, if A represents a polymer block that incorporates charge transport ability groups and B represents a polymer block that incorporates non-linear-optical ability groups, then the copolymers of the invention include any combinations of A and B units. As representative, but non-limiting examples, polymers of the forms A-B, B-A, A-B-A, B-A-B, and so on, are included.

With respect to the third point of the invention, inventors have developed photorefractive copolymers which are composed of a component that provides photoconductive (charge transport) ability and a component that provides non-linear optical ability. Since the copolymers have both components of charge transport and non-linear optical ability in one polymer chain, it can work as a kind of phase compatibilizer for all components to be mixable without separations. Even if the chtomophore or plascticizer functional material is mixed in the form of dopant, the composition still provides the long-term stability.

The comparatively lower Tg of inventors' polymers reduces the dependence on large amounts of plasticizer in the finished composition. This improves the handling properties and the photorefractive properties of the composition.

The photorefractive compositions according to the present invention have great utility in a variety of optical applications, including holographic storage, optical correlation, phase conjugation, non-destructive evaluation and imaging.

DETAILED DESCRIPTION OF THE INVENTION

The invention is a photorefractive composition. The composition comprises a copolymer matrix that provides photoconductive (charge transport) ability and a non-linear optical ability. Also, the copolymer may also comprise a part that provides a plasticizer ability. Optionally, the composition may also include other components as desired, such as sensitizer and plasticizer components.

Both of the photoconductive and non-linear optical components are incorporated as functional groups into the polymer structure, typically as side groups.

The group that provides the charge transport or photoconductive functionality may be any group known in the art to provide such capability. If this group is to be attached to the polymer matrix as a side chain, then the group should be capable of incorporation into a monomer that can be polymerized to form the polymer matrix of the composition.

Preferred photoconductive groups are phenyl amine derivatives, particularly carbazoles and di- and tri-phenyl diamine.

Most preferably the moiety that provides the photoconductive functionality is chosen from the group of phenyl amine derivatives consisting of the following structures (i) to (iii):

Structure (i)

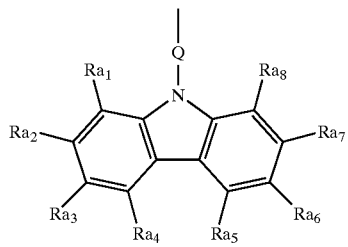

wherein Q represents an alkylene group, with or without a hetero atom, such as oxygen or sulfur, and preferably Q is an alkylene group represented by $(CH_2)p$; where p is between about 2 and 6; and wherein $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

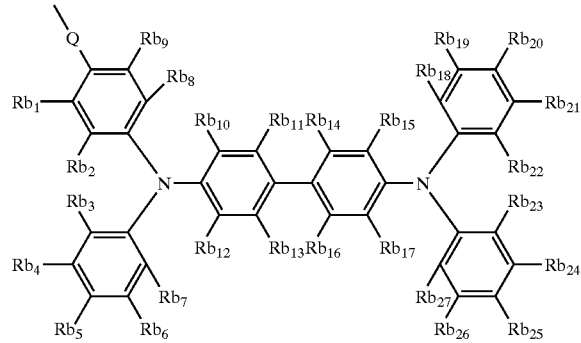

wherein Q represents an alkylene group, with or without a hetero atom, such as oxygen or sulfur, and preferably Q is an alkylene group represented by $(CH_2)p$; where p is between about 2 and 6; and wherein $Rb_1$–$Rb_{27}$ are independently selected from the group consisting of a hydrogen atom, a linear alkyl group with up to 10 carbons, a branched alkyl group with up to 10 carbons, and an aromatic group with up to 10 carbons; and Structure (iii)

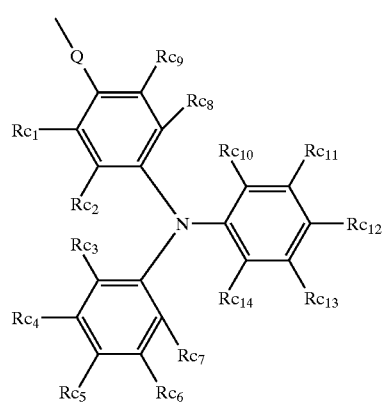

wherein Q represents an alkylene group, with or without a hetero atom, such as oxygen or sulfur, and preferably Q is an alkylene group represented by $(CH_2)p$; where p is between about 2 and 6, and wherein $Rc_1$–$Rc_{14}$ are independently selected from the group consisting of a hydrogen atom, a linear alkyl group, with up to 10 carbons, a branched alkyl group with up to 10 carbons, and an aromatic group with up to 10 carbons.

Likewise, the chromophore or group that provides the non-linear optical functionality may be any group known in the art to provide such capability. If this group is to be attached to the polymer matrix as a side chain, then the group, or a precursor of the group, should be capable of incorporation into a monomer that can be polymerized to form the copolymer matrix of the composition.

Preferred chromophore groups are aniline-type groups or dehydronaphtyl amine groups.

The chromophore or group that provides the non-linear optical functionality used in the present invention is represented by formula (0):

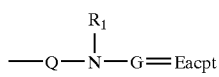

Formula (0)

wherein Q represents an alkylene group, with or without a hetero atom; such as oxygen or sulfur, and preferably Q is an alkylene group represented by $(CH_2)p$; where p is an integer of about 2 to 6; $R_1$ is selected from the group consisting of a hydrogen atom, a linear alkyl group with up to 10 carbons, a branched alkyl group with up to 10 carbons, and an aromatic group with up to 10 carbons, and preferably $R_1$ is an alkyl group which is selected from methyl, ethyl, propyl, butyl, pentyl and hexyl; G is a group having a bridge of π-conjugated bond; and Eacpt is an electron acceptor group.

In the above definition, by the term "a bridge of π-conjugated bond", it is meant a molecular fragment that connects two or more chemical groups by π-conjugated bond. A π-conjugated bond contains covalent bonds between atoms that have σ bonds and π bonds formed between two atoms by overlap of their atomic orbitals (s+p hybrid atomic orbitals for σ bonds; p atomic orbitals for π bonds).

By the term "electron acceptor", it is meant a group of atoms with a high electron affinity that can be bonded to a π-conjugated bridge. Exemplary acceptors, in order of increasing strength, are:

$C(O)NR^2 < C(O)NHR < C(O)NH_2 < C(O)OR < C(O)OH < C(O)R < C(O)H < CN < S(O)_2R < NO_2$

As typical exemplary electron acceptor groups, functional groups which is described in prior of art U.S. Pat. No. 6,267,913 and shown in the following structure figure can be used. U.S. Pat. No. 6,267,913 is hereby incorporated by reference for the purpose of describing donors and acceptors useful in this invention. The symbol "‡" in a chemical structure herein specifies an atom of attachment to another chemical group and indicates that the structure is missing a hydrogen that would normally be implied by the structure in the absence of the "‡".

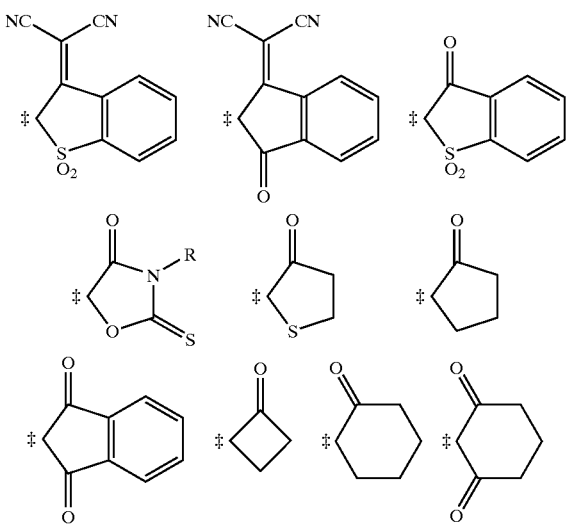

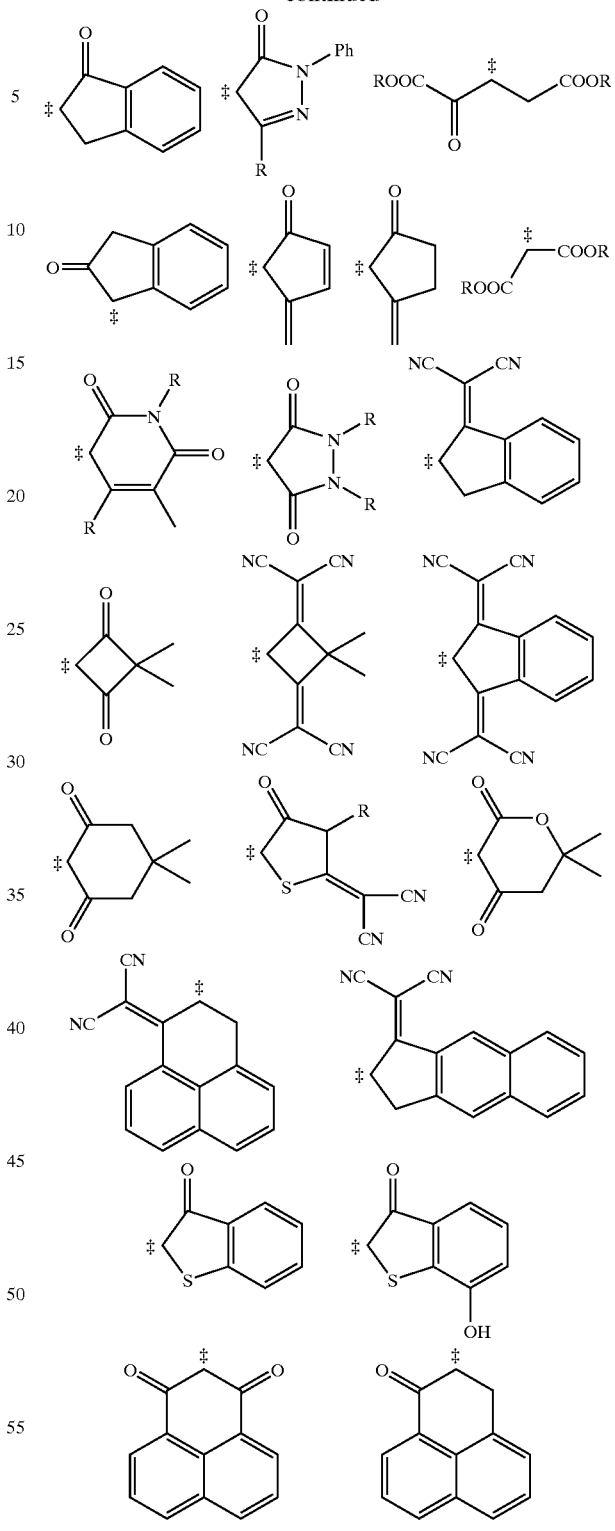

wherein R is selected from the group consisting of a hydrogen atom, a linear alkyl group with up to 10 atoms, a branched alkyl group with up to 10 atoms, and an aromatic group with up to 10 carbons.

Most preferably the moiety that provides the non-linear optical functionality is such a case that G in formula (0) is represented by a structure selected from the group consisting of the structures (iv), (v) and (vi);

Structure (iv)

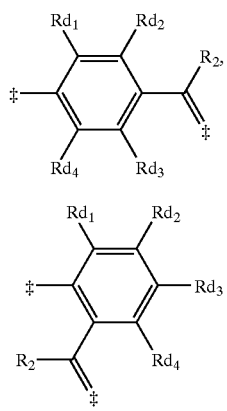

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons, and preferably $Rd_1$–$Rd_4$ are all hydrogen; $R_2$ is selected from the group consisting of a hydrogen atom, a linear alkyl group with up to 10 atoms, a branched alkyl group with up to 10 atoms, and an aromatic group with up to 10 carbons;

Structure (vi)

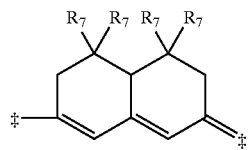

wherein $R_7$ represents a linear or branched alkyl group with up to 10 carbons; and wherein Eacpt in formula (0) is an electron acceptor group and represented by a structure selected from the group consisting of the structures;

Structure (iv)

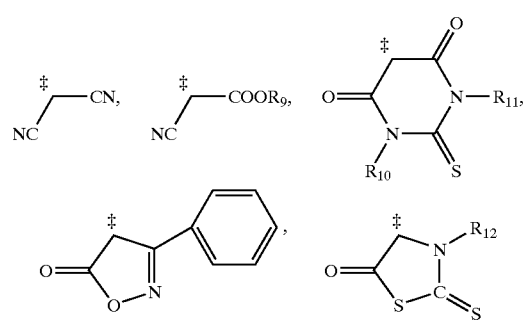

wherein $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

A preferred copolymer used for the photorefractive composition is a co-polymer which comprises a first repeating unit selected from the group consisting of the structures (i)″, (ii)″ and (iii)″, and a second repeating unit represented by the formula (0)″.

Structure (i)″

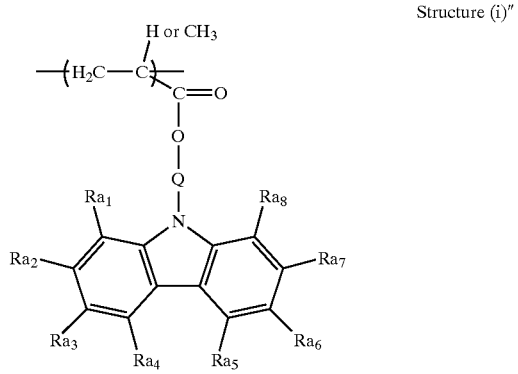

wherein Q and $Ra_1$–$Ra_8$ are the same meaning as in Structure (i);

Structure (ii)″

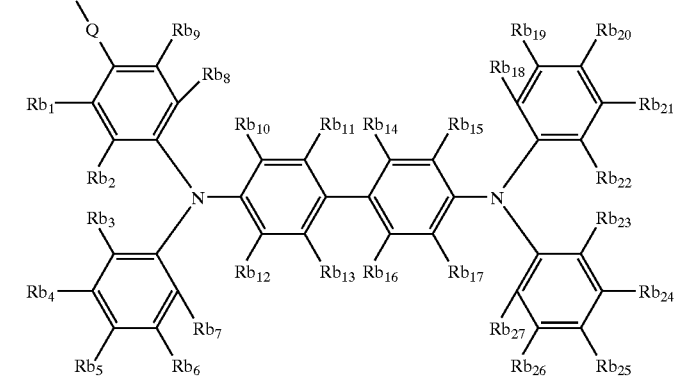

wherein Q and $Rb_1$–$Rb_{27}$ are the same meaning as in Structure (ii);

Structure (iii)″

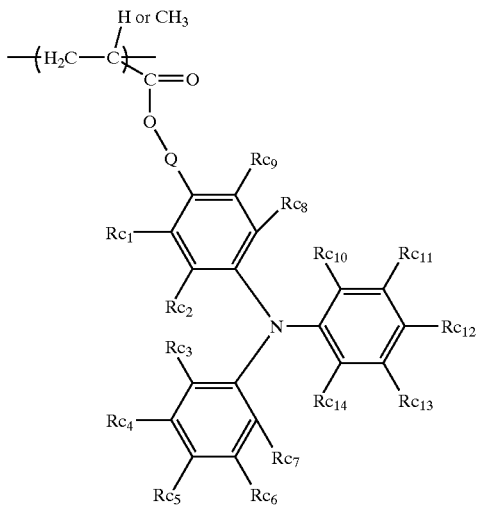

wherein Q and $Rc_1$–$Rc_{14}$ are the same meaning as in Structure (iii);

Formula (0)″

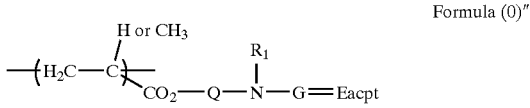

wherein Q, $R_1$, G and Eacpt are the same meaning as in formula (0).

The copolymer matrix is preferably synthesized from a monomer incorporating both one of the above photoconductive groups and one of the above chromophore groups. The inventors have recognized that a number of physical and chemical properties are desirable in the copolymer matrix. It is preferred if the copolymer itself incorporates both a charge transport group and a chromophore group, to form copolymers. Physical properties of the formed copolymer that are of importance are the molecular weight and the glass transition temperature, Tg. Also, it is valuable and desirable, although not essential, that the copolymer should be capable of being formed into films, coatings and shaped bodies of various kinds by standard polymer processing techniques, such as solvent coating, injection molding and extrusion.

In the present invention, the copolymer generally has a weight average molecular weight, Mw, of from about 3,000 to 500,000, preferably from about 5,000 to 100,000. The term "weight average molecular weight" as used herein means the value determined by the GPC (gel permeation chromatography) method in polystyrene standards, as is well known in the art.

For good photorefractive properties, the photorefractive composition should be substantially amorphous and non-crystalline or non-glassy under the conditions of use. Therefore, it is preferred that the finished photorefractive composition has a relatively low glass transition temperature, Tg, such as below about 50° C., more preferably below about 40° C. Preferred temperature ranges for the Tg are 10–50° C., most preferably 20–40° C. If the pure polymer itself has a glass transition temperature higher than these preferred values, which will generally be the case, components may be added to lower the Tg, as discussed in more detail below.

Nevertheless, it is preferred that the polymer itself has a relatively low glass transition temperature, by which inventors mean a Tg no higher than about 125° C., more preferably no higher than about 120° C., and most preferably no higher than about 110° C. or 100° C.

Particularly, in order to lower glass transition temperature of copolymer itself, the already described monomers that provides the plasticizing ability can be incorporated. Sometimes the incorporation of plasticizing monomers into the copolymer which has charge transport and non-linear-optics ability can reduce the glass transition temperature more than 50° C. or 20° C., at least 5° C., depending on incorporation ratio.

In more detail, the moiety that provides the plasticizing ability is chosen from the group consisting of a linear alkyl group with up to 10 carbons, a linear alkenyl group with up to 10 carbons, a branched alkyl group with up to 10 carbons, and a branched alkenyl group with up to 10 carbons. In more detail, the monomer is chosen from the group of $CH_2=CR_0$—COOR wherein $R_0$ represents a hydrogen atom or methyl group, and R represents a $C_{2-10}$ alkyl group, such as butylacrylate, ethyl acrylate, propyl acrylate, 2-ethylhexyl(meth)acrylate and hexyl(meth)acrylate.

A relatively low glass transition temperature is preferred because a greater mobility of polymer chains that exhibit close to or above their glass transition temperature give higher orientation during voltage application, and lead to better performance, such as high photoconductivity, fast response time and high diffraction efficiency, of the photorefractive device.

In principle, essentially any polymer backbone, including, but not limited to, polyurethane, epoxy polymers, polystyrene, polyether, polyester, polyamide, polyimide, polysiloxane, and polyacrylate could be used, with the appropriate side chains attached, to make the polymer matrices of the invention.

Preferred types of backbone units are those based on acrylates or styrene. Particularly preferred are acrylate-based monomers, and more preferred are methacrylate monomers. The first polymeric materials to include photoconductive functionality in the polymer itself were the polyvinyl carbazole materials developed at the University of Arizona. However, these polyvinyl carbazole polymers tend to become viscous and sticky when subjected to the heat-processing methods typically used to form the polymer into films or other shapes for use in photorefractive devices.

In contrast, inventors' preferred materials, and particularly the (meth)acrylate-based, and more specifically acrylate-based, polymers, have much better thermal and mechanical properties. That is, they provide better workability during processing by injection-molding or extrusion, for example. This is particularly true when the polymers are prepared by radical polymerization.

Particular examples of monomers including a phenyl amine derivative group as the charge transport component are carbazolylpropyl(meth)acrylate monomer; 4-(N,N-diphenylamino)-phenylpropyl(meth)acrylate; N-[(meth)acroyloxypropylphenyl]-N,N', N'-triphenyl-(1,1'-biphenyl)-4,4'-diamine; N-[(meth)acroyloxypropylphenyl]-N'-phenyl-N,N'-di(4-methylphenyl)-(1,1'-biphenyl)-4,4'-diamine; and N-[(meth)acroyloxypropylphenyl]-N'-phenyl-N,N'-di(4-buthoxyphenyl)-(1,1'-biphenyl)-4,4'-diamine. Such monomers can be used singly or in mixtures of two or more monomers.

Particular examples of monomers including a chromophore group as the non-linear optical component are N-ethyl, N-4-dicyanomethylidenyl acrylate and N-ethyl, N-4-dicyanomethylidenyl-3, 4, 5, 6, 10-pentahydronaphtylpentyl acrylate.

Diverse polymerization techniques are known in the art. One such conventional technique is radical polymerization, which is typically carried out by using an azo-type initiator, such as AIBN (azoisobutyl nitrile). In this radical polymerization method, the polymerization catalysis is generally used in an amount of from 0.01 to 5 mol %, preferably from 0.1 to 1 mol %, per mole of the sum of the polymerizable monomers.

In the present invention, conventional radical polymerization can be carried out under inactive gas and in the presence of a solvent, such as ethyl acetate, tetrahydrofuran, butyl acetate, toluene or xylene.

Usually, the generally used inactive gas is, preferably, nitrogen, argon, or helium. Polymerization pressure is from 1 to 50 atom, preferably from 1 to 5 atom.

The solvent is generally used in an amount of from 100 to 10000 wt %, preferably from 1000 to 5000 wt %, per weight of the sum of the polymerizable monomers.

The conventional radical polymerization is preferably carried out at a temperature of from about 50° C. to 100° C., and is allowed to continue for about 1 to 100 hours, depending on the desired final molecular weight and polymerization temperature, and taking into account the polymerization rate.

Also, as another polymerization technique for radical polymerization, a recently developed polymerization technique known as living radical polymerization can be used for preparing polymers with unusually good photorefractive properties. In particular, living radical polymerization has the potential to form polymers with unusually low polydispersity, such as less than 2.5, such as less than 2.0. Also, particularly living radical polymerization has the capabilities to produce block copolymers, such as A-B type, A-B-A, or B-A-B type block copolymers, very efficiently.

Details of the living radical polymerization method are described in the literature. They may be founds for example, in the following papers: T. Patten et al., "Radical polymerization yielding polymers with Mw/Mn~1.05 by homogeneous atom transfer radical polymerization", *Polymer Preprints*, 1996, 37, 575. K. Matyjasewski et al., "Controlled/living radical polymerization. Halogen atom transfer radical polymerization promoted by a Cu(I)/Cu(II) redox process", *Macromolecules*, 1995, 28, 7901. M. Sawamoto et al., "Ruthenium-mediated living radical polymerization of methyl methacrylate", *Macromolecules*, 1996, 29, 1070.

Living radical polymerization is also described at length in U.S. Pat. No. 5,763,548 to Carnegie-Mellon University, which is incorporated herein by reference in its entirety.

Briefly, inventors' living radical polymerization technique involves the use of a polymerization initiator, a catalyst and an activating agent.

The initiator is typically a halogen-containing organic compounds. After polymerization, this initiator or components of the initiator are attached to the polymer at both polymer terminals. The polymerization initiator preferably used is an ester-based or styrene-based derivative containing a halogen in the α-position. Particularly preferred are 2-bromo(or chloro)methylpropionic acid, or bromo(or chloro)-1-phenyl derivatives. Specific examples of these derivatives include ethyl 2-bromo(or chloro)-2-methylpropionate, ethyl 2-bromo(or chloro)propionate, 2-hydroxyethyl 2-bromo(or chloro)-2-methylpropionate, 2-hydroxyethyl 2-bromo(or chloro)propionate, and 1-phenyl ethyl bromide(chloride).

Instead of a mono bromo(chloro) type initiator, a di-bromo(chloro) type initiator, such as dibromo(chloro) ester derivative, can be used. Such initiators are represented by the formula:

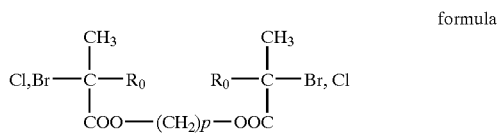

formula wherein $R_0$ represents a hydrogen atom or methyl group; and p is 2–6.

Of these initiators, most preferred is ethylene bis(2-bromo (chloro)-2-methylpropionate). By using this initiator, inventors have discovered that block copolymers, and particularly A-B-A type or B-A-B type block copolymers, can be produced very efficiently.

In inventors' process, the polymerization initiator is generally used in an amount of from 0.01 to 20 mol %, preferably from 0.1 to 10 mol %, and more preferably from 0.2 to 5 mol %, per mole of the sum of the polymerizable monomers.

Various types of catalysts are known, including perfluoroalkyl iodide type, TEMPO (phenylethoxytetramethylpiperidine) type, and transition metal type. Inventors have discovered that high-quality polymers can be made by using transition-metal catalysts, which are safer, simpler, and more amenable to industrial-scale operation than TEMPO-type catalysts. Therefore, in the process of the invention a transition-metal catalyst is preferred.

Non-limiting examples of transition metals that may be used include Cu, Ru, Fe, Rh, V, and Ni. Particularly preferred is Cu. Typically, but not necessarily, the transition metal is used in the form of the metal halide (chloride, bromide, etc.).

The transition metal in the form of a halide or the like is generally used in the amount of from 0.01 to 3 moles, and preferably from 0.1 to 1 mole, per mole of polymerization initiator.

The activating agent is an organic ligand of the type known in the art that can be reversibly coordinated with the transition metal as a center to form a complex. The ligand preferably used is a bipyridine derivative, imercaptans derivative, trifluorate derivative, or the like. When complexed with the activating ligand, the transition metal catalyst is rendered soluble in the polymerization solvent. In other words, the activating agent serves as a co-catalyst to activate the catalyst, and start the polymerization.

The ligand is used in an amount of normally from 1 to 5 moles, and preferably from 2 to 3 moles, per mole of transition metal halide.

The use of the polymerization initiator and the activating agent in the above recommended proportions makes it possible to provide good results in terms of the reactivity of the living radical polymerization and the molecular weight and weight distribution of the resulting polymer.

In the present invention, living radical polymerization can be carried out without a solvent or in the presence of a solvent, such as butyl acetate, toluene or xylene.

To initiate the polymerization process, the monomer(s), polymerization initiator, catalyst, activating agent and solvent are introduced into the reaction vessel. As the process starts, the catalyst and polymerization initiator form a radical, which attacks the monomer and starts the polymerization growth.

The living radical polymerization is preferably carried out at a temperature of from about 70° C. to 130° C., and is allowed to continue for about 1 to 100 hours, depending on the desired final molecular weight and polymerization temperature, and taking into account the polymerization rate and deactivation of catalyst.

In the block copolymer preparation by living radical polymerization, the monomer addition sequence is important for achieving the desired copolymer structure. For example, to make random copolymers, both the non-linear optics-group containing and the charge transport-group-containing monomers can be added at the same time.

However, by adding the monomers sequentially, block type copolymers can be prepared. For example, to prepare an A-B type block copolymer, wherein polymer block A has charge transport ability and polymer block B has non-linear-optical ability, firstly the monomer having charge transport ability is polymerized, preferably by using a mono bromo (chloro) type initiator. Subsequently, the second monomer having non-linear-optical ability is added to continue the polymerization. In this way, an A-B type, block copolymer can be produced. During this polymerization procedure, the second monomer is added at the time when the first monomer is polymerized more than 50% by weight, normally 70% by weight or more, preferably 80% by weight or more, and more preferably 90% by weight or more.

On the other hand, if the monomer having non-linear-optical ability is polymerized first, a B-A type block copolymer can be produced. Similarly to the above polymerization procedure, the second monomer is added at the time when the first monomer is polymerized more than 50% by weight, normally 70% by weight or more, preferably 80% by weight or more, and more preferably 90% by weight or more.

Further, if living radical polymerization is carried out in a manner such that, first, the monomer having charge transport ability is polymerized, then the second monomer having non-linear-optical ability is added to continue polymerization, and thirdly an additional amount of the monomer having charge transport ability is added to continue polymerization, an A-B-A type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

Moreover, if living radical polymerization is carried out in a manner such that, first, the monomer having charge transport ability is polymerized (block A), then the second monomer having non-linear-optical ability is added to continue polymerization (block B), and thirdly the monomer having plasticizer ability is added to continue polymerization (block C), an A-B-C type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

If the copolymer constitutes two or more of polymer blocks A, the A-type constituting blocks need not necessarily be prepared from, the same monomer. Likewise, if the copolymer constitutes two or more of polymer blocks B, the B-type blocks need not necessarily be prepared from the same monomer. Likewise, if the copolymer constitutes two or more of polymer blocks C, the C-type blocks need not necessarily be prepared from the same monomer. Thus, the individual blocks may be of different forms represented by A1, A2, A3, etc., B1, B2; B3, and C1, C2, C3 etc. In this way, a large diversity of polymers, such as A1-B-A2, B1-B2-A, A1-B-C, B1-B2-C, or A1-B1-A2-C can be produced.

By carrying out the radical polymerization technique based on the teachings and preferences given above, it is possible to prepare random or block copolymers carrying both charge transport and non-linear optical groups. Further, by following the techniques described herein, it is possible to prepare such materials with exceptionally good properties, such as photoconductivity, response time and diffraction efficiency.

Sometimes, for better photorefractivity, the copolymer can be dispersed with a component that possesses non-linear optical properties through the polymer matrix, as is described in U.S. Pat. No. 5,064,264 to IBM, which is incorporated herein by reference. Suitable materials are known in the art and are well described in the literature, such as in D. S. Chemla & J. Zyss, "Nonlinear Optical Properties of Organic Molecules and Crystals" (Academic Press, 1987). Also, as described in U.S. Pat. No. 6,090,332 to Seth R. Marder et. al., fused ring bridge, ring locked chromophores that form thermally stable photorefractive compositions can be used. For typical, non-limiting examples of chromophore additives, the following chemical structure compounds can be used:

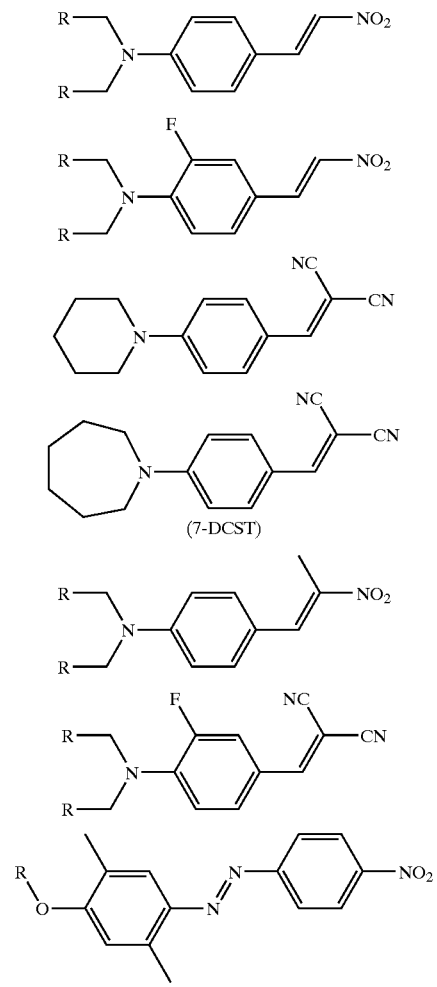

-continued

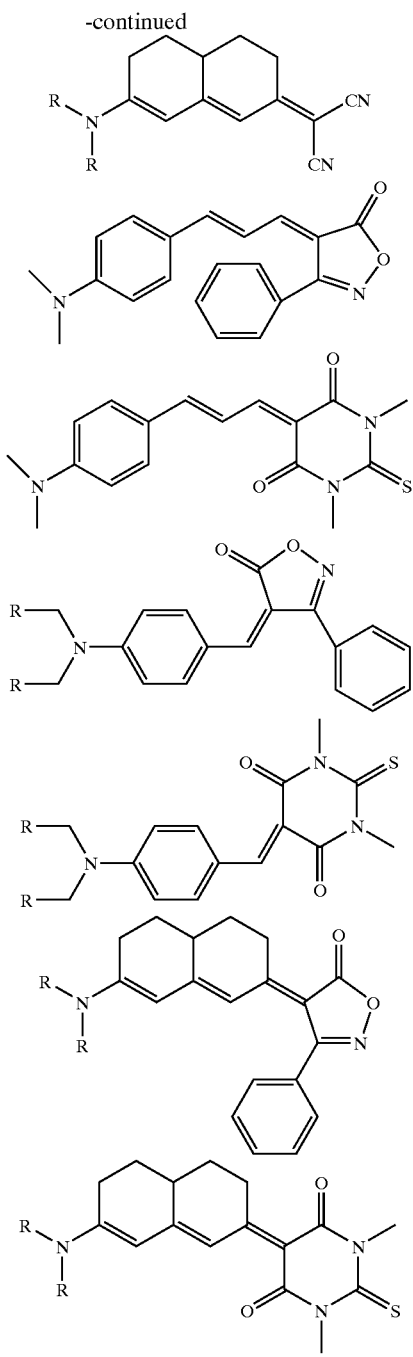

The chosen compound(s) is sometimes mixed in the matrix copolymer in a concentration of about up to 80 wt %, more preferably 40 wt %.

On the other hand, if necessary, the copolymer can be mixed with a component that possesses charge transport properties into the polymer matrix, again as is described in U.S. Pat. No. 5,064,264 to IBM. Preferred charge transport compounds are good hole transfer compounds, for example N-alkyl carbazole or triphenylamine derivatives.

Furthermore, if necessary, the copolymer can be mixed with a component that possesses plasticizerproperties into the polymer matrix. As preferred plasticizercompounds, any commercial plasticizer compound can be used, such as phthalate derivatives or low molecular weight hole transfer compounds, for example N-alkyl carbazole or triphenylamine derivatives.

As detail examples, ethyl catbazole, 4-(N,N-diphenylamino)-phenylpropyl acatate; N-(acetoxypropylphenyl)-N,N',N'-triphenyl-(1,1'-biphenyl)-4,4'-diamine; N-(acetoxypropylphenyl)-N'-phenyl-N,N'-di(4-methylphenyl)-(1,1'-biphenyl)-4,4'-diamine; and N-(acetoxypropylphenyl)-N'-phenyl-N,N'-di(4-buthoxyphenyl)-(1,1'-biphenyl)-4,4'-diamine. Such compounds can be used singly or in mixtures of two or more monomers. Also, un-polymerized monomers can be low molecular weight hole transfer compounds, for example 4-(N,N-diphenylamino)-phenylpropyl(meth)acrylate; N-[(meth)acroyloxypropylphenyl]-N,N',N'-triphenyl-(1,1'-biphenyl)-4,4'-diamine; N-[(meth)acroyloxypropylphenyl]-N'-phenyl-N,N'-di(4-methylphenyl)-(1,1'-biphenyl)-4,4'-diamine; and N-[(meth)acroyloxypropylphenyl]-N'-phenyl-N,N'-di(4-buthoxyphenyl)-(1,1'-biphenyl)-4,4'-diamine. Such monomers can be used singly or in mixtures of two or more monomers.

To prepare the non-linear optical containing copolymer, monomers that have side-chain groups possessing non-linear-optical ability should be used. Non-limiting examples of monomers that may be used are those containing the following chemical structures:

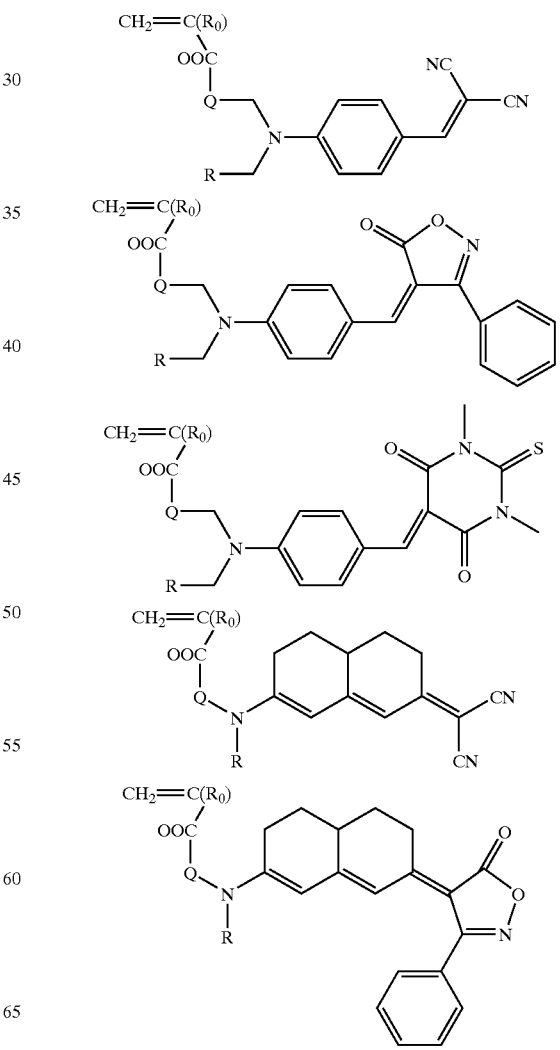

-continued

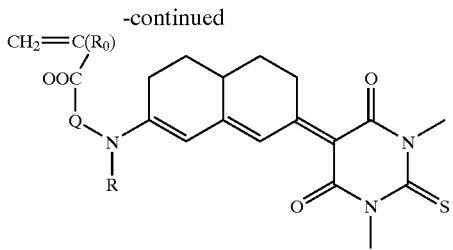

wherein Q represents an alkylene group with or without a hetero atom, such as oxygen or sulfur, and preferably Q is an alkylene group represented by $(CH_2)p$; where p is between about 2 and 6; $R_0$ is a hydrogen atom or methyl group, and R is a linear or branched alkyl group with up to 10 carbons; and preferably R is a alkyl group which is selected from methyl, ethyl, and propyl.

Inventors have discovered a new technique for preparing this invention copolymers. Inventors' technique involves the use of a precursor monomer containing a precursor functional group for non-linear optical ability. Typically, this precursor is represented by the following general formula:

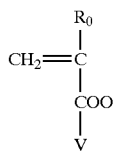

wherein $R_0$ is a hydrogen atom or methyl group, and V is selected from the group consisting of the following structures 1 to 3:

Structure 1

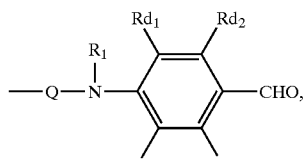

Structure 2

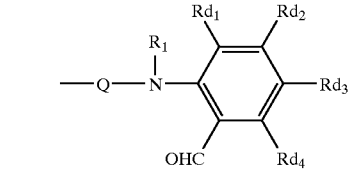

wherein, in both structures 1 and 2, Q represents an alkylene group, with or without a hetero atom, such as oxygen or sulfur, and preferably Q is an alkylene group represented by $(CH_2)p$; where p is between about 2 and 6; and wherein $Rd_1$–$Rd_4$ are independently selected from the group consisting of a hydrogen atom, a linear alkyl group with up to 10 carbons, a branched alkyl group with up to 10 atoms, and an aromatic group with up to 10 carbons, and preferably $Rd_1$–$Rd_4$ are hydrogen; and wherein $R_1$ represents a linear or branched alkyl group with up to 10 carbons, and preferably $R_1$ is an alkyl group selected from methyl, ethyl, propyl, butyl, pentyl and hexyls; and Structure 3

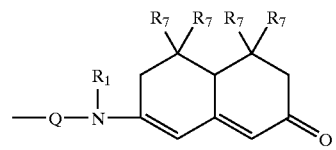

wherein Q represents an alkylene group, with or without a hetero atom, such as oxygen or sulfur, and preferably Q is an alkylene group represented by $(CH_2)p$; where p is of about 2 to 6; and wherein $R_1$ represents a linear or branched alkyl group with up to 10 carbons, and preferably $R_1$ is an alkyl group selected from methyl, ethyl, propyl, butyl, pentyl and hexyls; and wherein $R_7$ represents a linear or branched alkyl group with up to 10 carbons.

The procedure for performing the radical polymerization in this case involves the use of the same polymerization methods and operating conditions with same preferences, as have already been described above.

After the precursor copolymer has been formed, it can be converted into the corresponding copolymer having non-linear optical groups and capabilities by a condensation reaction. Typically, the condensation reagent may be selected from the group consisting of

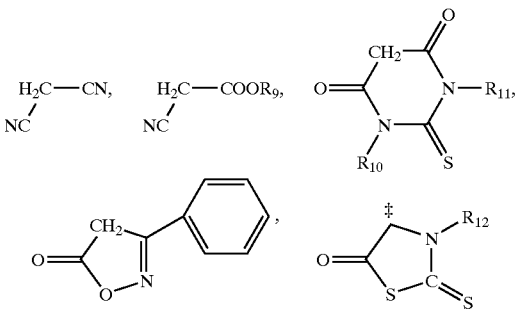

wherein $R_9$, $R_{10}$, $R_{11}$, and $R_{12}$ are independently selected from the group consisting of a hydrogen atom, a linear alkyl group with up to 10 carbons, a branched alkyl group with up, to 10 carbons, and an aromatic group with up to 10 carbons.

The condensation reaction can be done at room temperature for 1–100 hrs, in the presence of a pyridine derivative catalyst. A solvent, such as butyl acetate, chloroform, dichloromethylene, toluene or xylene can be used. Optionally, the reaction may be carried out without the catalyst at a solvent reflux temperature of 30° C. or above for about 1 to 100 hours.

Inventors have discovered that use of a monomer containing a precursor group for non-linear-optical ability, and conversion of that group after polymerization tends to result in a polymer product of lower polydispersity than the case if a monomer containing the non-linear-optical group is used. This is, therefore, inventors' preferred technique.

Also, there are no restrictions on the ratio of monomer units for the copolymers comprises a repeating unit including the first moiety having charge transport ability, a repeating unit including the second moiety having non-linear-optical ability, and a repeating unit including the third moiety having plasticizing ability. However, as a typical representative example, per 100 weight parts of [a (meth)

acrylic monomer having charge transport ability], [a (meth) acrylate monomer having non-linear optical ability] is a range between 1 and 200 weight parts, preferably a range between 10 and 100 weight parts. If this ratio is less than about 1 weight part, the charge transport ability of copolymer itself is weak, and the response time tends to be too slow to give good photorefractivity. However, even in this case, by addition of already described low molecular weight components having non-linear-optical ability can enhance photorefractivity. On the other hand, if this ratio is more than about 200 weight parts, the non-linear-optical ability of copolymer itself is weak, and the diffraction efficiency tends to be too low to give good photorefractivity. However, even in this case, by addition of already described low molecular weight components having charge transport ability can enhance photorefractivity.

Also, a (meth)acrylic monomer having plasticizerability is, per 100 weight parts of a (meth)acrylic monomer having charge transport ability, is a range between 1 and 100 weight parts, preferably a range between 2 and 20 weight parts. If this ratio is more than 100 weight parts, the non-linear-optical ability and the charge transport ability of copolymer itself are weak. The response time tends to be too slow and the diffraction efficiency tends to be too low to give good photorefractivity. However, even in this case, by addition of already described low molecular weight components having non-linear-optical ability and the charge transport ability can enhance photorefractivity.

Optionally, other components may be added to the polymer matrix to provide or improve the desired physical properties mentioned earlier in this section. Usually, for good photorefractive capability, it is preferred to add a photosensitizer to serve as a charge generator. A wide choice of such photosensitizers is known in the art. Typical, but non-limiting examples of photosensitizers that may be used are 2, 4,7-trinitro-9-fluorenone (TNF) and C60. The amount of photosensitizer required is usually less than 3 wt %.

As mentioned above, it is preferred that the copolymer matrix have a relatively low glass-transition temperature, and be workable by conventional processing techniques. Optionally, a plasticizer may be added to the composition to reduce the glass transition temperature and/or facilitate workability. The type of plasticizer suitable for use in the invention is not restricted; many such materials will be familiar to those of skill in the art. Representative typical examples include N-alkylcarbazole and dioctylphthalate. Oligomer-type compounds of the charge transport or non-linear-optical monomers may also be used to control the Tg of the composition.

In general, the smallest amount of plasticizer required to provide a suitable overall Tg for the composition should be used. Compositions with large amounts of plasticizer tend to have lower stability, as the polymer matrix and the plasticizer may phase separate over time. Also, the photorefractive properties of the material are diminished by dilution of the active components by the plasticizer.

As discussed above, the invention provides polymers of comparatively low Tg when compared with similar polymers prepared in accordance with prior art methods. Inventors have recognized that this provides a benefit in terms of lower dependence on plasticizers. By selecting copolymers of intrinsically moderate Tg and by using methods that tend to depress the average Tg, it is possible to limit the amount of plasticizer required for the composition to preferably no more than about 30% or 25%, and more preferably lower, such as no more than about 20%.

In the art, many of the compositions of the photorefractive polymers showed poor phase stabilities and gave haziness after days. Once the composition films showed the haziness, they don't show good photorefractive properties. This film composition haziness is usually coming from incompatibilities between several photorefractive components. Generally, photorefractive compositions comprise from components having charge transport ability and components having non-linear optics ability. The components having charge transport ability are usually hydrophobic and nonpolar material. On the other hand, components having non-linear optics ability are usually hydro-philic and polar material. Therefore, as a nature of these components, there were tendencies to be phase separated and give hazy compositions.

In the previously described paper (Macromolecules, 2000, 33, 4074), acrylate-based polymers that include carbazole-based side chains and several stilibene-type side chains comprise of components having charge transport ability and the components having non-linear optics ability. In this paper, it is said these polymers can be expected to have good phase stability, although there is no actual detail data.

However, on the other hand, in the present invention, the photorefractive polymers composition showed very good phase stabilities and gave no haziness even after several months. They don't change good photorefractive properties, as the composition are very stable and no phase separations are observed. These film composition stabilities are probably due to copolymer structures. That is, the components having charge transport ability and the components having non-linear optics ability are existing in one polymer chain and phase separation are irrelevant and unlikely to happen.

This good phase stabilities of this invention can be obtained even by addition of charge transport, non-linear optical, or plasticizer low molecular weight compounds. Seemingly, this invention copolymer gave more tolerance for phase stability, since the copolymer can work as a kind of phase compatibilizer.

This good phase stabilities of this invention last more than a day or a week, or sometimes more than six months. Also, even by heating up the testing samples, which usually enhance phase separation speed, the samples showed very good phase stability for more than a day or a week, or sometimes more than six months. These good phase stability can facilitate the invention copolymer into optical device applications for more commercial products. For acceleration tests, heating test temperature have no restriction, but usually, the temperature is between 40 and 120° C., preferably between 60 and 80° C.

The photorefractive materials of the invention provide combinations of desirable properties not previously available to the art.

One particularly advantageous feature is the high photoconductivity. In the context of the invention, by photoconductivity inventors mean the increase in conductivity of the photorefractive material under laser irradiation. The photoconductivity of a sample of material may be measured by the following method. First, the steady-state conductivity properties are measured in the dark, by applying an electric field across the sample, allowing the system to come to steady state, and measuring the resulting current. Then the measurements are repeated while illuminating the sample with a pulse from a single laser beam. The photoconductivity, $\Phi_{photo}$, can then be calculated using the following relation:

$$\Phi_{photo}=(i_{photo}-1 dark)/A_{beam}E_a$$

where:

$E_a$ is the applied electric field, $A_{beam}$ is the illuminated area, $i_{photo}$ is electric current with laser irradiation, and $i_{dark}$ is electric current without irradiation Photoconductivity is important because it is a measure of how efficiently charge transport can take place in the material. If all other parameters are fixed, the higher the photoconductivity, the faster is the device response time.

Typical photoconductivities for organic materials and polymers are in the range from about 0.01 pS/cm to a maximum of no higher than 1,000 pS/cm. In fact, the value for conventional photorefractive polymers is usually less than 10 pS/cm, as described in several papers, for example in M. A. Diaz-Garcia et al. (*Chem. Mater.*, 1999, 11, 1784). However, surprisingly, the polymers of the invention generally have photoconductivity of more than 100 pS/cm, which is at least an order of magnitude better than currently used materials, and preferably exhibit a photoconductivity of about 200 pS/cm or more, and more preferably about 500 pS/cm or more.

Very few materials have been reported with photoconductivity higher than 10 pS/cm, and even fewer with photoconductivity higher than 100 pS/cm. To inventors' knowledge, the highest photoconductivity ever reported is 2,800 pS/cm (N. Peyghambarian et al., *J. Mater. Chem.*, 1999, 9, 2251), in a PVK-type material.

Yet, for inventors' materials inventors have measured photoconductivity of 3,000 pS/cm or more, specifically 3,500 pS/cm.

Furthermore, inventors are aware of no photorefractive composition that provides a photoconductivity of at least 100 pS/cm and, at the same time, offers any one of the other advantageous properties provided herein, such as a polydispersity of no more than about 2.5 or 2.0, a response time of no more than about 50 ms, a diffraction efficiency of at least about 5%, the good mechanical properties and easy processability of an acrylate-based polymer, the presence of both charge transport and non-linear optical groups as side chains in the polymer, especially in the form of block copolymers, or the efficiency and flexibility of preparation of the living radical polymerization technique.

Another particularly advantageous feature is the fast response time. Response time is the time needed to build up the diffraction grating in the photorefractive material when exposed to a laser writing beam. The response time of a sample of material may be measured by transient four-wave mixing (TFWM) experiments, as detailed in the Examples section below. The data may then be fitted with the following bi-exponential function:

$$\eta(t) = \eta_0 (1 - a_1 e^{-t/J_1} - a_2 e^{-t/J_2})^2$$

with $a_1 + a_2 = 1$ where $\eta(t)$ is the diffraction efficiency at time t, $\eta_0$ is the steady-state diffraction efficiency, and $J_1$ and $J_2$ are the grating build-up times. The smaller number of $J_1$ and $J_2$ is defined as the response time.

Response time is important because a faster response time means faster grating build-up, which enables the photorefractive composition to be used for wider applications, such as real-time hologram applications.

Typical response times for known photorefractive materials range from seconds to sub-seconds. Times longer than 100 ms are common. Faster response times have been reported, see W. F. Moemer, Appl. Phys. Lett., Vol. 73, p. 1490 (1998) but, in order to get these higher speeds, higher field strengths have been required. Such higher field strengthsmay be difficult in an industrial, rather than a laboratory, environment. Also, the polyvinyl carbazole polymersused to obtain higher speeds become sticky and difficult to handle during heat processing. In contrast, the acrylate-based, or more specifically methacrylate-based polymers, that are preferred herein provide excellent workability during heat processing and other polymer handling methods.

In comparison with typical prior art materials, the photorefractive compositions of the invention provide good response times, such as no more than about 50 ms, and preferably faster, such as no more than about 40 ms, no more than about 30 ms, or no more than about 20 ms.

Furthermore, these response times can be achieved without resorting to a very high electric field, expressed as biased voltage. By a very high biased voltage, inventors mean a field in excess of about 100V/$\mu$m. In inventors' materials, fast response times can generally be achieved at biased voltages no higher than about 100 V/$\mu$m, more preferably no higher than about 90 V/$\mu$m.

And, as discussed with respect to photoconductivity, these good response times can be provided in conjunction with one or more of the other advantageous properties as they are characterized above, such as high photoconductivity, low polydispersity, high diffraction efficiency, good processing capabilities, block copolymer capability, and efficient polymerization techniques.

Yet another advantageous feature is the diffraction efficiency, $\eta$. Diffraction efficiency is defined as the ratio of the intensity of the diffracted beam to the intensity of the incident probe beam, and is determined by measuring the intensities of the respective beams. Obviously, the closer to 100% is the ratio, the more efficient is the device.

In general, for a given photorefractive composition, a higher diffraction efficiency can be achieved by increasing the applied biased voltage.

In comparison with typical prior art materials, the photorefractive compositions of the invention provide good diffraction efficiencies, such as at least about 5%, and preferably higher, such as at least about 10%. And, as discussed with respect to photoconductivity, these good diffraction efficiencies can be provided in conjunction with one or more of the other advantageous properties as they are characterized above, such as high photoconductivity, or fast response time, and in conjunction with good processing capabilities, block copolymer capability, and efficient polymerization techniques.

The invention is now further described by the following examples, which are intended to be illustrative of the invention, but are not intended to limit the scope or underlying principles in any way.

EXAMPLES

Production Example 1

(a) Monomers Containing Charge Transport Groups

Two types of charge transport monomers were purchased from Fuji Chemical, Japan:

(i) a carbazole-type monomer (3-carbazolylpropyl acrylate), and (ii) a triphenyl diamine type (N-[acroyloxypropylphenyl]-N,N',N'-triphenyl-(1,1'-biphenyl)-4,4'-diamine) (TPD acrylate). The TPD acrylate type monomer had the structure:

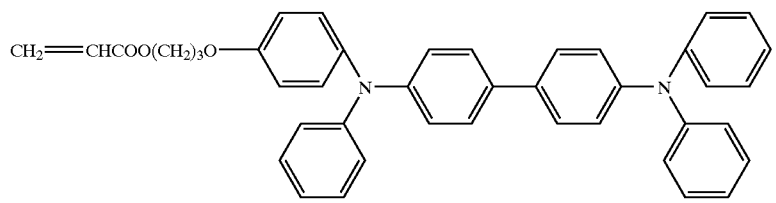
These monomers were custom-prepared for inventors by using the scheme below in which standard abbreviations for reagents and catalysts are used.
(i) Carbazole-type monomer:
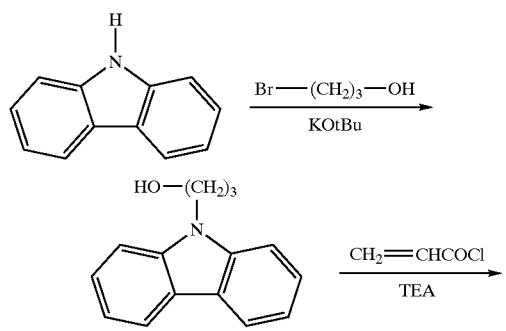
-continued
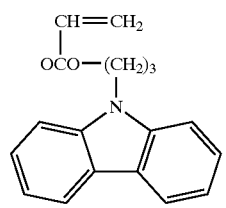
(ii) TPD-type monomer:
TPD acrylate monomer was prepared by the following procedure.
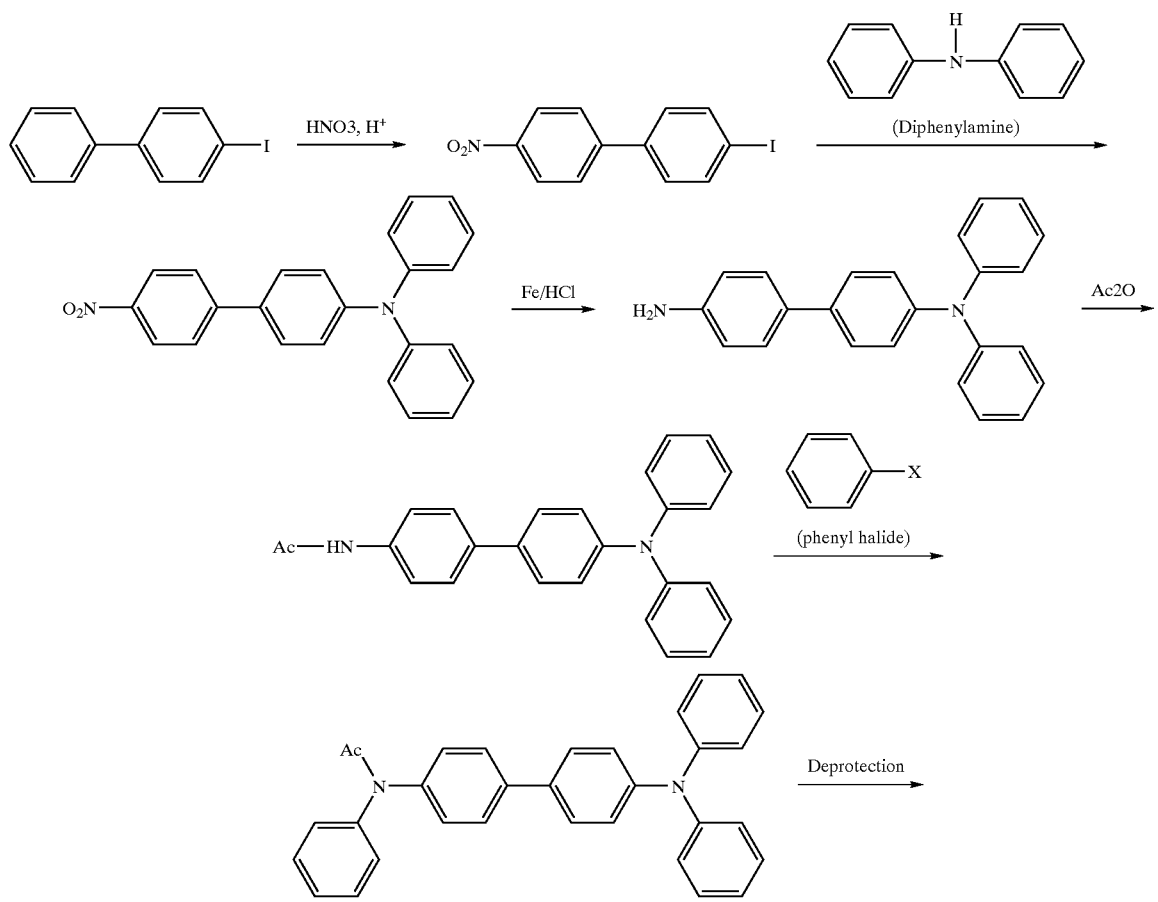

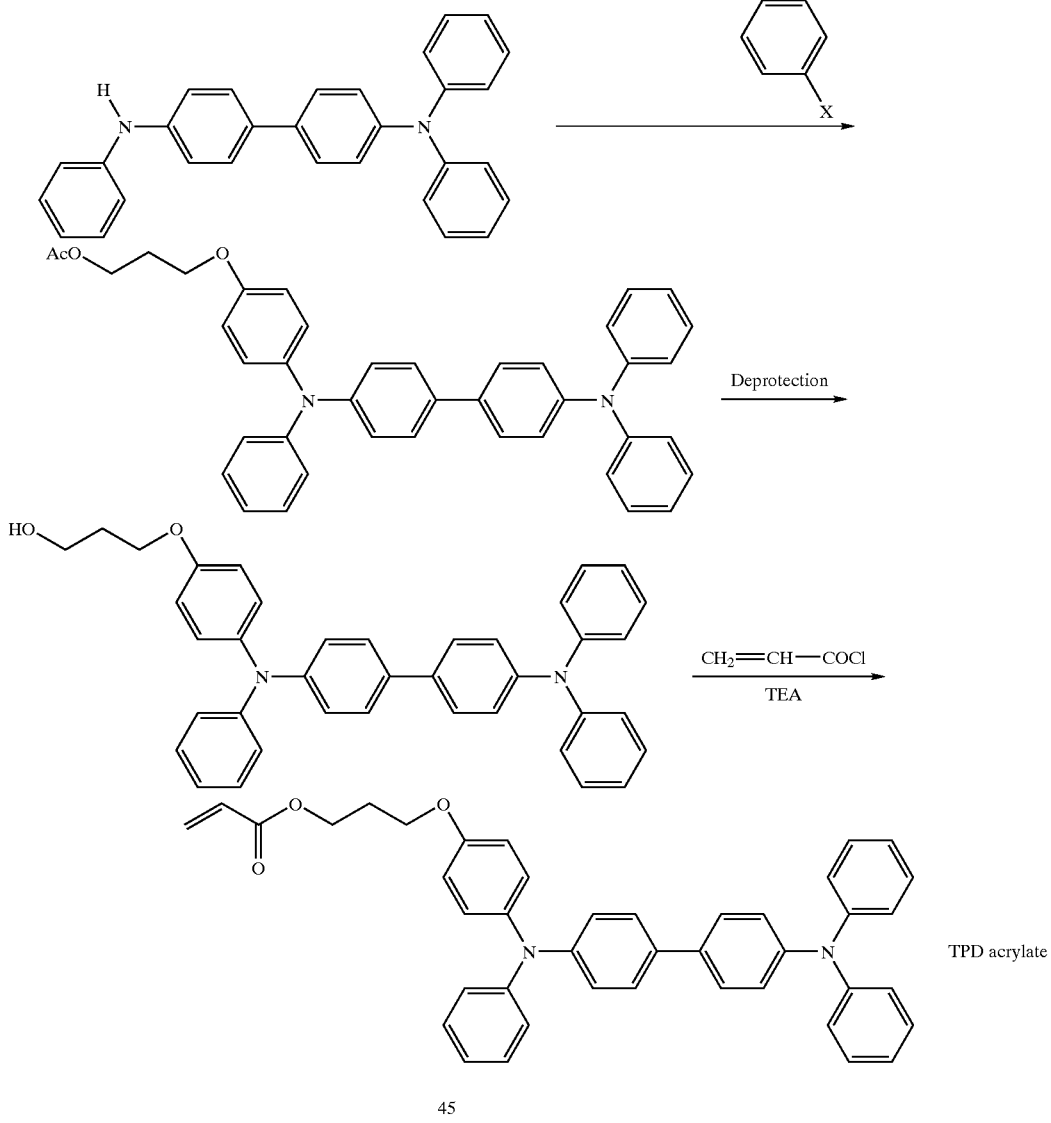

In the above procedure, usage of 3-methyl diphenylamine instead of diphenylamine and 3-methylphenyl halide instead of phenyl halide can result in the formation of N(acroyloxypropylphenyl)-N'-phenyl-N,N'-di(3-methylphenyl)-(1,1'-biphenyl)-4,4'-diamine.

(b) Monomers Containing Non-Linear-Optical Groups

The non-linear-optical precursor monomer 5-[N-ethyl-N-4-formylphenyl]amino-pentyl acrylate was synthesized according to the following synthesis scheme:

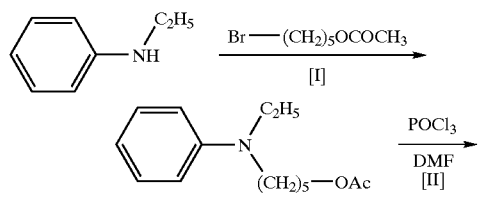

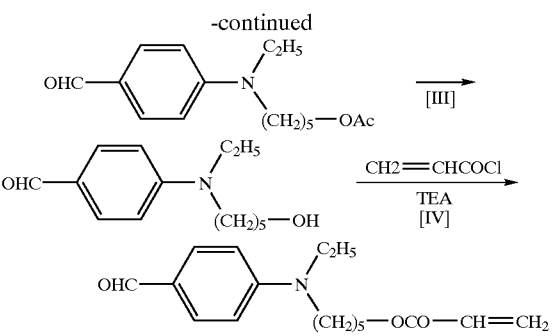

Step I:

Into bromopentyl acetate (5 mL, 30 mmol) and toluene (25 mL), triethylamine (4.2 mL, 30 mmol) and N-ethylaniline (4 mL, 30 mmol) were added at room temperature. This solution was heated at 120° C. overnight. After cooling down, the reaction mixture was rotary-evaporated. The residue was purified by silica gel chromatography (developing solvent: hexane/acetone=9/1). An oily amine compound was obtained. (Yield: 6.0 g (80%))

Step II:

Anhydrous DMF (6 mL, 77.5 mmol)-was cooled in an ice-bath. Then, POCl₃ (2.3 mL, 24.5 mmol) was added dropwise into the 25 mL flask, and the mixture was allowed to come to room temperature. The amine compound (5.8 g, 23.3 mmol) was added through a rubber septum by syringe with dichloroethane. After stirring for 30 min., this reaction mixture was heated to 90° C. and the reaction was allowed to proceed overnight under an argon atmosphere.

The next day, the reaction mixture was cooled, and poured into and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=3/1). An aldehyde compound was obtained. (Yield: 4.2 g (65%))

Step III:

The aldehyde compound (3.92 g, 14.1 mmol) was dissolved with methanol (20 mL). Into this mixture, potassium carbonate (400 mg) and water (1 mL) were added at room temperature and the solution was stirred overnight. The next day, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone=1/1). An aldehyde alcohol compound was obtained. (Yield: 3.2 g (96%))

Step IV:

The aldehyde alcohol (5.8 g, 24.7 mmol) was dissolved with anhydrous THF (60 mL). Into this mixture, triethylamine (3.8 mL, 27.1 mmol) was added and the solution was cooled by ice-bath. Acrolyl chloride (2.1 mL, 26.5 mmol) was added and the solution was maintained at 0° C. for 20 minutes. Thereafter, the solution was allowed to warm up to room temperature and stirred at room temperature for 1 hour, at which point TLC indicated that all of the alcohol compound had disappeared. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=1/1). The compound yield was 5.38 g (76%), and the compound purity was 99% (by GC).

(c) Polymerization Initiator Ethylene bis(2-Bromo (chloro)-2-methylpropionate) (Br-BMP)

The polymerization initiator ethylene bis(2-bromo (chloro)-2-methylpropionate) (Br-BMP) was synthesized in the following manner. First, anhydrous ethylene glycol (5 g, 81 mmol), triethylamine (17.2 g, 170 mmol), pyridine (1 mL, 12 mmol), and THF (50 mL) were charged into a reaction vessel. To the mixture, 2-bromopropionic acid bromide (42.0 g, 171 mmol) was added, and the reaction vessel was cooled over an ice bath to suppress an exothermic reaction.

The reaction was allowed to run to completion overnight, and the resulting precipitate was removed by filtration. Ethyl acetate (200 mL) and saturated brine (150 mL) were added to the filtrate. The mixture was then allowed to stand for a few minutes. The resulting upper ethyl acetate layer was washed twice with diluted hydrochloric acid and then three times with saturated brine (150 mL), and then dried with anhydrous magnesium sulfate. Magnesium sulfate was removed, and the ethyl acetate was then distilled off under reduced pressure to obtain a crude product.

The crude product thus obtained was purified by silica gel chromatography (developing solvent: 1/1 mixture of ethyl acetate and hexane) to obtain Br-BMP as the desired, product. The yield of Br-BMP was 24.2 g (83% by weight).

d) Synthesis of Non-Linear-Optical Chromophore 7-DCST

The non-linear-optical precursor 7-DCST (7 member ring dicyanostyrene, 4-homopiperidinobenzylidene malononitrile) was synthesized according to the following two-step synthesis scheme:

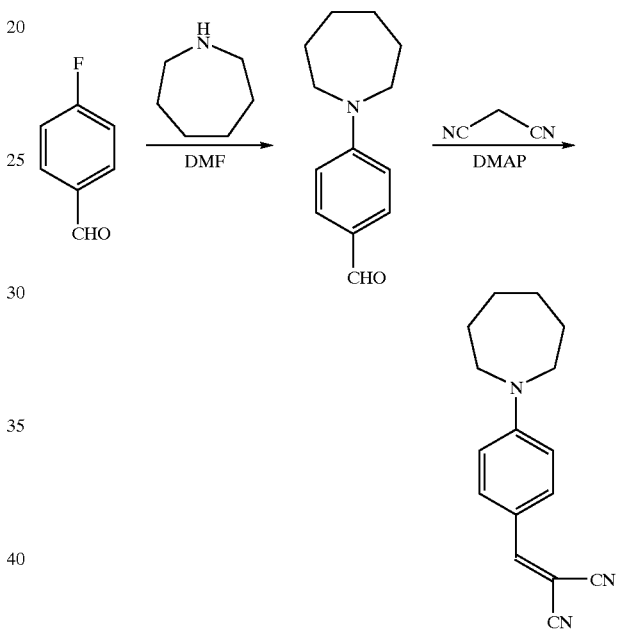

A mixture of 4-fluorobenzaldehyde (17.8 g, 143 mmol), homopiperidine (15.0 g, 151 mmol), lithium carbonate (55 g, 744 mmol), and DMF (100 mL) was stirred at 50 C for 16 hr. Water (500 mL) was added to the reaction mixture. The products were extracted with ether (1L). After removal of ether, the crude products were purified by silica gel column chromatography using hexanes-ethyl acetate (9:1) as eluent. 4-(Dimethylamino)pyridine (100 mg, 0.82 mmol) was added to a solution of the, 4-homopiperidinobenzaldehyde (18.2 g, 89.5 mmol) and malononitrile (9.1 g, 137.8 mmol) in methanol (60 mL). The reaction mixture was kept at room temperature and the product was collected by filtration and purified by recrystallization from dichloromethane. Yield (17.1 g, 48%)

e) Synthesis of Plasticizer TPD-Ac

The plascticizer TPD-Ac was synthesized from the same intermediate which was used for TPD acrylate synthesis according to the following one-step synthesis scheme:

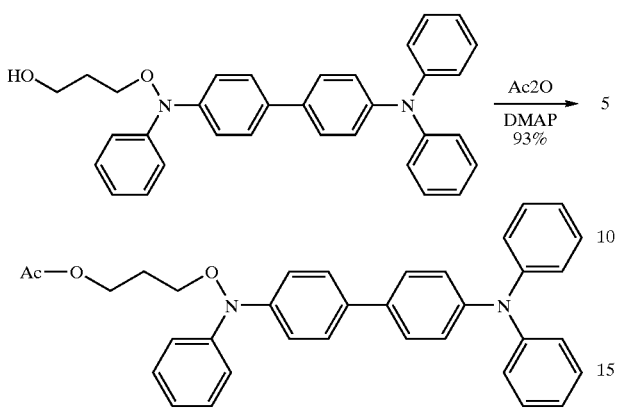

TPD alochol (2.8 g, 5.0 mmol), which was one intermediate for TPD Acrylate monomer, was dissolved with dichloromethane (10 mL). Into this solution, acetic anhydride (0.8 mL, 10.6 mmol) and 4-(Dimethylamino)pyridine (100 mg, 0.82 mmol) were added and stirred at 50° C. for 16 hr. Water (5 mL) was added to the reaction mixture. The products were extracted with dichloromethane (10 mL). After removal of dichloromethane, the crude products were purified by silica gel column chromatography using hexanes-ethyl acetate (1:1) as eluent. The product was collected. Yield (2.97 g, 93%)

(f) Other Materials

Besides the above monomers and initiator, other chemicals, such as copper bromide, bipyridine and ethyl 2-bromo-2-methylpropionate, were purchased from Aldrich Chemicals, Milwaukee, Wis.

Production Example 2

Preparation of Copolymer by Azo Initiator Polymerization of Charge Transport Monomer and Non-Linear-Optical Precursor Monomer (TPD Acrylate/Chromophore. Type)

The charge transport monomer N-[(meth) acroyloxypropylphenyl]-N,N', N'-triphenyl-(1,1'-biphenyl)-4,4'-diamine (TPD acrylate) (2.5 g, 4.1 mmol) and the non-linear-optical precursor monomer 5-[N-ethyl-N-4-formylphenyl]amino-pentyl acrylate (0.75 g, 2.6 mmol), prepared as described in Production Example 1 were put into a three-necked flask. After toluene (9.8 g) was added and purged by argon gas for 1 hour, azoisobutylnitrile (9.4 mg) was added into this solution. Then, the solution was heated to 65° C., while continuing to purge with argon gas.

After 18 hrs polymerization, the polymer solution was diluted with toluene. The polymer was precipitated from the solution and added to methanol, then the resulting polymer precipitate was collected and washed in diethyl ether and methanol. The white polymer powder was collected and dried. The yield of polymer was essentially 100%.

As before, the weight average and number average molecular weights were measured by gel permeation chromatography, using a polystyrene standard. The results were Mn=17,462, Mw=34,044, giving a polydispersity of 1.95.

To form the polymer with non-linear-optical capability, the precipitated precursor polymer (2.5 g) was dissolved with chloroform (12 mL). Into this solution, dicyanomalonate (1.0 g, 15.1 mmol) and dimethylarninopyridine (40 mg, 0.33 mmol) were added, and the reaction was allowed to proceed overnight at 40° C. As before, the polymer was recovered from the solution by filtration of impurities, followed by precipitation into methanol, washing and drying.

Production Example 3

Preparation of Copolymer by AIBN Radical Polymerization of Charge Transport Monomer and Non-Linear-Optical Precursor Monomer (TPD Acrylate/Chromophore Type)

The charge-transport monomer N-[(meth) acroyloxypropylphenyl]-N,N',N'-triphenyl-(1,1'-biphenyl)-4,4'-diamine (TPD acrylate) (5.5 g, 8.9 mmol) and the non-linear-optical precursor monomer 5-[N-ethyl-N-4-formylphenyl]amino-pentyl acrylate (1.10 g, 3.8 mmol), prepared as described in Production Example 1 were put into a three-necked flask. After toluene (15.4 g) was added and purged by argon gas for 1 hour, azoisobutylnitrile (30 mg) was added to this solution. The solution was then heated to 65° C., while continuing to purge with argon gas.

After 18 hrs polymerization, the polymer solution was diluted with toluene. The polymer was precipitated from the solution and added to methanol, the resulting polymer precipitate was collected and washed in diethyl ether and methanol. The white polymer powder was collected and dried. The yield of polymer was essentially 100%.

As before, the weight average and number average molecular weights were measured by gel permeation chromatography, using a polystyrene standard. The results were Mn=18,255, Mw=34,617, giving a polydispersity of 1.90.

To form the polymer with non-linear-optical capability, the precipitated precursor polymer (5.5 g) was dissolved with chloroform (22 mL). Into this solution, dicyanomalonate (1.06 g, 16.1 mmol) and dimethylaminopyridine (56 mg, 0.46 mmol) were added, and the reaction was allowed to proceed overnight at 40° C. As before, the polymer was recovered from the solution by filtration of impurities, followed by precipitation into methanol, washing and drying.

Production Example 4

Preparation of Copolymer by AIBN Radical Polymerization of Charge Transport Monomer, Non-Linear-Optical Precursor Monomer, and Plasticizer Monomer (TPD Acrylate/Chromophore/Plasticizer Type)

The charge transport monomer N-[(meth) acroyloxypropylphenyl]-N,N',N'-triphenyl-(1,1'-biphenyl)-4,4'-diamine (TPD acrylate) (2.1 g, 3.4 mmol), the non-linear-optical precursor monomer 5-[N-ethyl-N-4-formylphenyl]amino-pentyl acrylate (0.63 g, 2.2 mmol), prepared as described in Production Example 1, and 2-ethylhexyl acrylate (0.14 g, 0.78 mmol) were put into a three-necked flask. After toluene (6.7 g) was added and purged with argon gas for 1 hour, azoisobutylnitrile (9.2 mg) was added into this solution. The solution was then heated to 65° C., while continuing to purge with argon gas.

After 18 hrs polymerization, the polymer solution was diluted with toluene. The polymer was precipitated from the solution by adding to methanol, the resulting polymer precipitate was collected and washed in diethyl ether and methanol. The white polymer powder was collected and dried. The yield of polymer was essentially 100%.

As before, the weight average and number average molecular weights were measured by gel permeation chromatography, using a polystyrene standard. The results were Mn=27,796, Mw=61,171, giving a polydispersity of 2.20.

To form the polymer with non-linear-optical capability, the precipitated precursor polymer (2.5 g) was dissolved with chloroform (12 mL)., Into this solution, dicyanomalonate (0.8 g, 12.1 mmol) and dimethylaminopyridine (40 mg, 0.33 mmol) were added, and the reaction was allowed to proceed overnight at 40° C. As before, the polymer was recovered from the solution by filtration of impurities, followed by precipitation into methanol, washing and drying.

Production Example 5

Preparation of Copolymer by Radical Polymerization of Charge Transport Monomer and Non-Linear-Optical Precursor Monomer (TPD Acrylate/Chromophore Type)

The charge transport monomer N-[(meth) acroyloxypropylphenyl]-N,N',N'-triphenyl-(1,1'-biphenyl)-4,4'-diamine (TPD acrylate) (2.75 g, 4.46 mmol) and the non-linear-optical precursor monomer 5-[N-ethyl-N-4-formylphenyl]amino-pentyl acrylate (0.55 g, 1.90 mmol), prepared as described in Production Example 1, bipyridine (110 mg, 0.70 mmol), and toluene (6 mL) were put into a four-necked flask equipped with a mechanical stirrer, a nitrogen inlet, a condenser, and a rubber septum. After purged with argon gas for 1 hr, Br-BMP (54 mg, 0.15 mmol) dissolved with toluene (1 mL) and CuBr (43 mg, 0.30 mmol) were added into this solution. The solution was then heated to 90° C., while continuing to be purged with argon gas.

The polymerization reaction was allowed to proceed with stirring for another 18 hrs. The resulting polymer solution was diluted with toluene, followed by filtration to remove catalyst-related impurities and polymer precipitation into methanol. The precipitated polymer was collected and washed in methanol. The polymer yield was essentially 100%. As before, the weight average and number average molecular weights were measured by gel permeation chromatography, using a polystyrene standard. The results were Mn=9,973, Mw=14,577, giving a polydispersity of 1.46.

To form the polymer with non-linear-optical capability, the precipitated precursor polymer (3.0 g) was dissolved with chloroform (12 mL). Into this solution, dicyanomalonate (570 mg, 8.64 mmol) and dimethylaminopyridine (30 mg) were added, and the reaction was allowed to proceed overnight at 40° C. As before, the polymer was recovered from the solution by filtration of impurities, followed by precipitation into methanol, washing and drying.

Production Example 6

Preparation of B-A-B Type Block Copolymer of Charge Transport Monomer and Non-Linear-Optical Precursor Monomer (TPD Acrylate/Chromophore Type)

A block copolymer of the type B-A-B, where B represents a block having non-linear-optical ability and A represents a block having charge transport ability, was prepared. The A polymer blocks comprised TPD acrylate and the B polymer blocks comprised polyacrylate which is 5-[N-ethyl-N-4-formylphenyl]amino-pentyl acrylate.

Into a four-necked flask equipped with a mechanical stirrer, a nitrogen inlet, a condenser, and rubber septum were put TPD acrylate (2.75 g, 4.46 mmol), bipyridine (110 mg, 0.704 mmol), and toluene (5 mL). After purged with argon gas for 1 hr, Br-BMP (54 mg, 0.15 mmol) dissolved with butyl acetate (1 mL) and CuBr (43 mg, 0.30 mmol) were added into this solution. The solution was then heated to 90° C., while continuing to be purged with argon gas.

At this point, the second monomer, 5-[N-ethyl-N-4-formylphenyl]amino-pentyl, acrylate (the precursor monomer for the non-linear-optical component) (0.55 g, 1.90 mmol) was added. The solution was stirred for another 18 hrs, then diluted with toluene, followed by filtration to remove catalyst-related impurities, and polymer precipitation into methanol. The precipitated polymer was collected and washed in diethyl ether and methanol.

To convert the precursor groups in the B blocks to groups with non-linear-optical ability, the precipitate (2.95 g) was dissolved with $CDCl_3$ (12 mL). Into this solution, dicyanomalonate (570 mg, 8.6 mmol) and dimethylaminopyridine (30 mg) were added, and the resulting solution was stirred overnight at 40° C. The polymerization reaction was allowed to proceed, and the resulting polymer solution was diluted with toluene, followed by filtration to remove catalyst-related impurities and polymer precipitation into methanol. The precipitated polymer was collected and washed in methanol. The polymer yield was essentially 100%.

As before, the weight average and number average molecular weights were measured by gel permeation chromatography, using a polystyrene standard. The results were Mn=9,041, Mw=12,434, giving a polydispersity of 1.38.

Example 1

Preparation of Photorefractive Composition

A photorefractive composition testing sample was prepared. The components of the composition were as follows:

| | |
|---|---|
| (i) TPD charge transport/chromophore type co-polymer (described in Production Example 2): | 60 wt % |
| (ii) Prepared chromophore powder of 7-DCST | 25 wt % |
| (iii) Prepared TPD Acetate plasticizer | 14.5 wt % |
| (iv) Purchased C60 sensitizer (MER, Tucson, AZ) | 0.5 wt % |

To prepare the composition, the components listed above were dissolved with toluene and stirred overnight at room temperature. After removing the solvent by rotary evaporator and vacuum pump, the residue was scratched and gathered.

To make testing samples, this powdery residue mixture was put on a slide glass and melted at 125° C. to make a 200–300 µm thickness film, or pre-cake. Small portions of this pre-cake were taken off and sandwiched between indium tin oxide (ITO) coated glass plates separated by a 105 µm spacer to form the individual samples.

Measurement 1

Diffraction Efficiency

The diffraction efficiency was measured at 633 nm by four-wave mixing experiments. Steady-state and transient four-wave mixing experiments were done using two writing beams making an angle of 20.5 degree in air; with the bisector of the writing beams making an angle of 60 degree relative to the sample normal. The resulting grating period for this geometry was 3.1 µm; the grating vector was directed at 60 degree relative to the sample normal.

For the four-wave mixing experiments, two s-polarized writing beams with equal intensity of 0.2 W/cm² in the sample were used; the spot diameter was 600 μm. A p-polarized beam of 1.7 mW/cm counter propagating with respect to the writing beam nearest to the surface normal was used to probe the diffraction gratings; the spot diameter of the probe beam in the sample was 500 μm. The diffracted and the transmitted probe beam intensities were monitored to determine the diffraction efficiency. The results are given in Table 1.

Measurement 2

Response Time

The diffraction efficiency was measured as a function of the applied field, using a procedure similar to that described in Measurement 1, by four-wave mixing experiments at 633 nm with s-polarized writing beams and a p-polarized probe beam. The angle between the bisector of the two writing beams and the sample normal was 60 degree and the angle between the writing beams was adjusted to provide a 3.1 μm grating spacing in the material (~20 degree). The writing beams had equal optical powers of 0.45 mW/cm², leading to a total optical power of 0.5 mW on the polymer, after correction for reflection losses. The beams were collimated to a spot size of approximately 500 μm. The optical power of the probe was 4 mW. The measurement of the grating buildup time was done as follows: an electric field of 40 V/μm was applied to the sample, and the sample was illuminated with one of the two writing beams and the probe beam for 100 ms. Then, the evolution of the diffracted beam was recorded. The response time was estimated as the time required to reach half of steady-state diffraction efficiency.

Measurement 3

Phase Stability

The tested samples were put into an oven at 60° C. At certain intervals, the opaqueness of samples was checked by microscope. If there is no opaqueness and crystal inside the composition, the samples could be said to have good phase stability. The results are given in Table 1.

Example 2

A photorefractive composition was obtained in the same manner as in the Example 1 except that TPD/chromophore-type copolymer prepared in Production Example was used and composition ratio was changed to the ratio as described in Table 1. The results of the above measurements 1 to 3 are given in Table 1.

Example 3

A photorefractive composition was obtained in the same manner as in the Example 1 except that TPD/chromophore-type copolymer prepared in Production Example. 4 was used. The results of the above measurements 1 to 3 are given in Table 1.

Example 4

A photorefractive composition was obtained in the same manner as in the Example 1 except that TPD/chromophore-type copolymer prepared in Production Example 5 was used and composition ratio was changed to the ratio as described in Table 1. The results of the above measurements 1 to 3 are given in Table 1.

Example 5

A photorefractive composition was obtained in the same manner as in the Example 1 except that B-A-B-type block copolymer prepared in, Production Example 6 was used and composition ratio was changed to the ratio as described in Table 1. The results of the above measurements 1 to 3 are given in Table 1.

Comparative Example 1

A poly(n-vinylcarbazole) (Aldrich Chemicals, Milwaukee, Wis.) was purchased. A photorefractive composition was obtained in the same manner as in the Example 1 except that poly(n-vinylcarbazole) was used, ethyl carbazole was used instead of TPD acetate plasticizer and composition ratio was changed to the ratio as described in Table. The results of the measurements 1 to 3 are given in Table 1.

TABLE 1

| Sample Number | Example 1 | Example 2 | Example 3 | Example 4 | Example 5 | Comparative Example 1 (Purchased PVK) |
|---|---|---|---|---|---|---|
| Sample composition (wt %): | | | | | | |
| Polymer | 60 | 51.5 | 60 | 60 | 60 | 49.5 |
| Chromophore 7-DCST | 25 | 30 | 25 | 30 | 28.6 | 35 |
| Plasticizer | 14.5 | 17.8 | 14.5 | 17.8 | 10.9 | 15 |
| Diffraction efficiency (%) at 60 V/μm | 11 | 11 | 50 | 25 | 17 | 30 |
| Response time | 11 (ms) at 71 V/μm | 19 (ms) at 29 V/μm | 57 (ms) at 60 V/μm | 17 (ms) at 60 V/μm | 16 (ms) at 60 V/μm | 48 (ms) at 60 V/μm |
| Phase stability at 60° C. | Good | Good | Good | Good | Good | Phase Separation |

What is claimed is:

1. A composition comprising a co-polymer, wherein:
(a) the co-polymer comprises a first repeating unit including a first moiety selected from the group consisting of the structures (i), (ii) and (iii), and a second repeating unit including a second moiety represented by the formula (0); wherein
(b) the composition exhibits photorefractive ability:

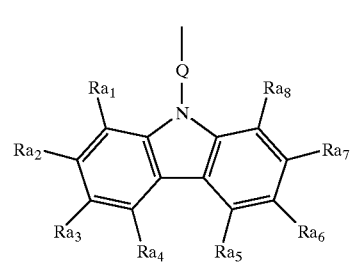

Structure (i)

wherein Q represents an alkylene group, with or without a hetero atom; $Ra_1$, $Ra_2$, $Ra_3$, $Ra_4$, $Ra_5$, $Ra_6$, $Ra_7$, and Ra₈ are each independently selected from the group consisting of a hydrogen atom, a linear alkyl group with up to 10 carbons, a branched alkyl group with up to 10 carbons, and an aromatic group with up to 10 carbons;

Structure (ii)

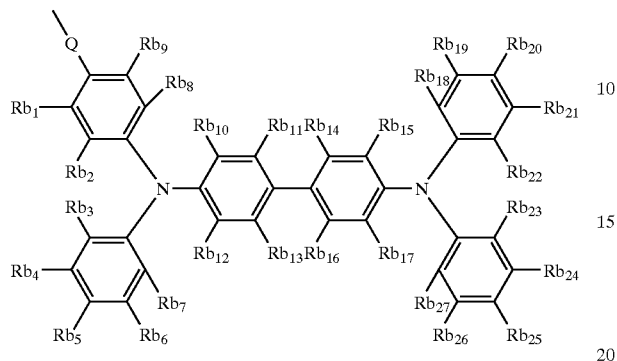

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)

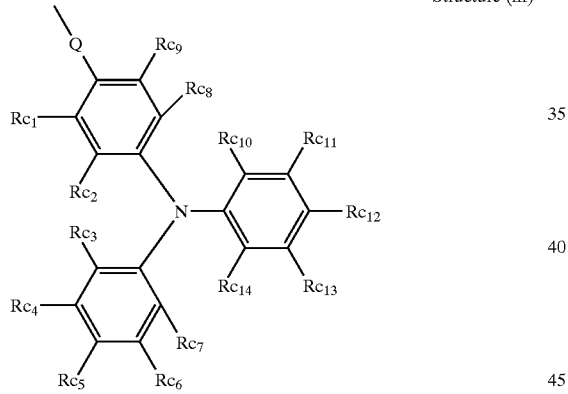

wherein Q represents an alkylene group, with or without a hetero atom, $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

Formula (0)

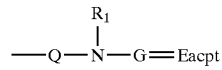

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group, wherein said G is represented by a structure selected from the group consisting of the structures (iv), (v) and (vi), with the proviso that when said first moiety is said structure (i) or (iii), said G is said structure (vi), wherein structures (iv), (v) and (vi) are:

Structure (iv)

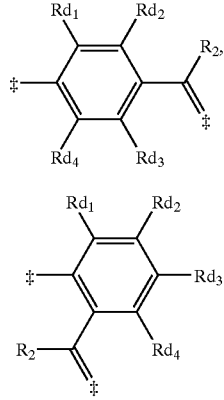

Structure (v)

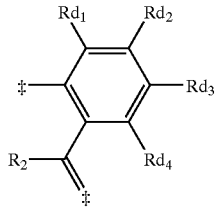

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

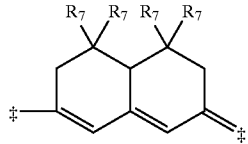

wherein $R_7$ represents a linear or branched alkyl group with up to 10 carbons; and
wherein Eacpt in formula (0) is an electron acceptor group and represented by a structure selected from the group consisting of the structures;

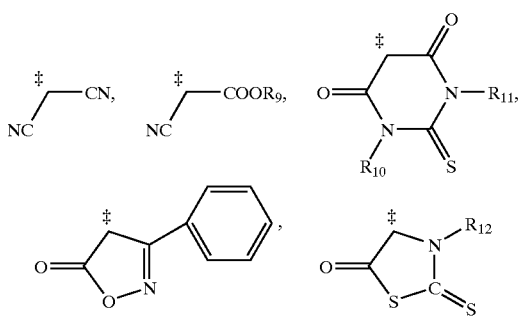

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

2. The composition of claim 1, wherein the co-polymer comprises a third repeating unit including a third moiety having plasticizing ability.

3. The composition of claim 2, wherein the third moiety having plasticizing ability is selected from the group consisting of a linear alkyl group with up to 10 carbons, a linear alkenyl group with up to 10 carbons, a branched alkyl group with up to 10 carbons, and a branched alkenyl group with up to 10 carbons.

4. A composition comprising a co-polymer prepared by radical polymerization, wherein:
(a) the co-polymer comprises a first repeating unit selected from the group consisting of the structures (i)″, (ii)″ and (iii)″, and a second repeating unit represented by the formula (0)″; wherein
(b) the composition exhibits photorefractive ability:

Structure (i)″

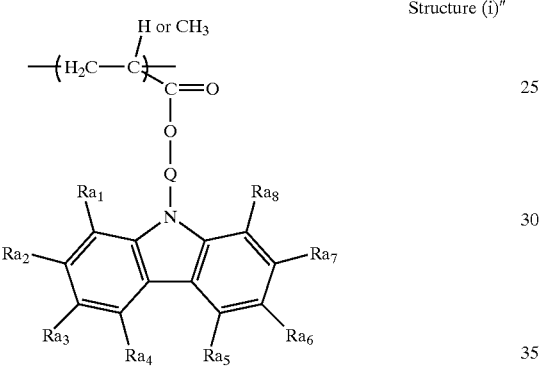

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are each independently selected from the group consisting of a hydrogen atom, a linear alkyl group with up to 10 carbons, a branched alkyl group with up to 10 carbons, and an aromatic group with up to 10 carbons;

Structure (ii)″

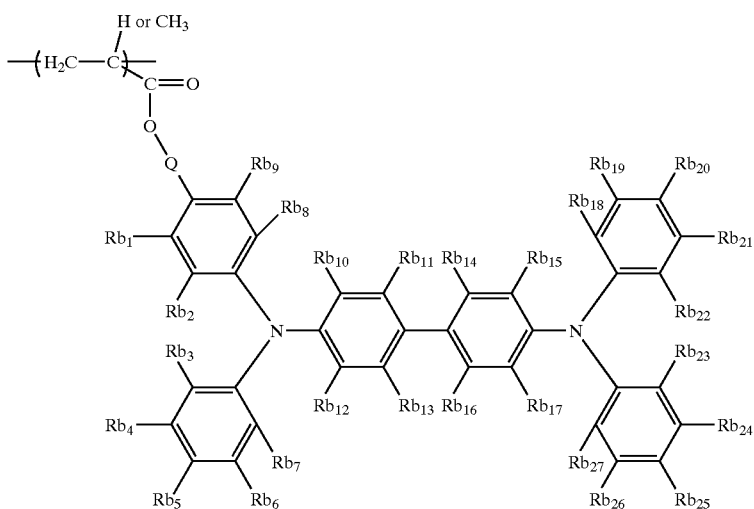

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)″

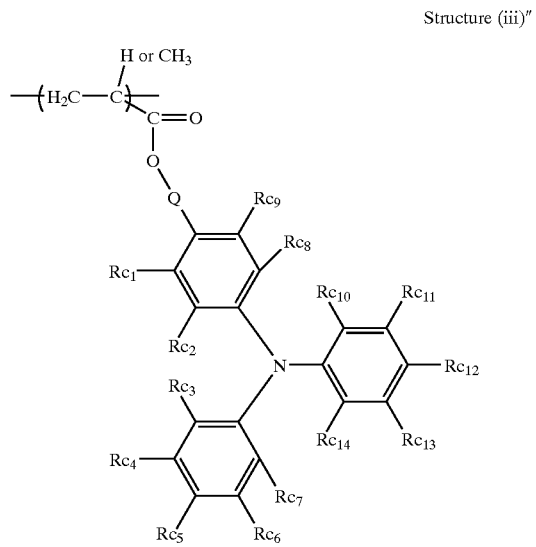

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

Formula (0)″

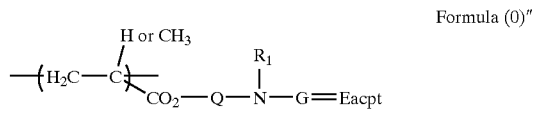

wherein Q represents an alkylene group, with or without a hetero atom; R₁ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group, wherein said G is represented by a structure selected from the group consisting of the structures (iv), (v) and (vi), with the proviso that when said first repeating unit is said structure (i)" or (iii)", said G is said structure (vi), wherein structures (iv), (v) and (vi) are:

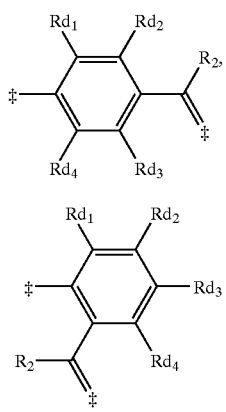

Structure (iv)

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons, $R_2$ is selected from the group consisting of a hydrogen atom, a linear alkyl group with up to 10 atoms, a branched alkyl group with up to 10 atoms, and an aromatic group with up to 10 carbons,

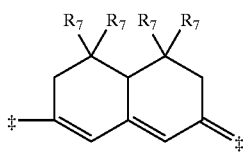

Structure (vi)

wherein $R_7$ represents a linear or branched alkyl group with up to 10 carbons; and wherein Eacpt in formula (0)" is an electron acceptor group and represented by a structure selected from the group consisting of the structures:

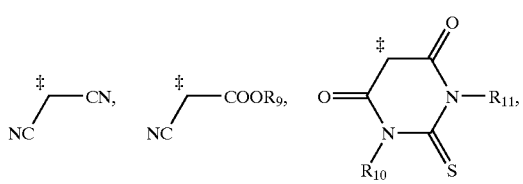

-continued

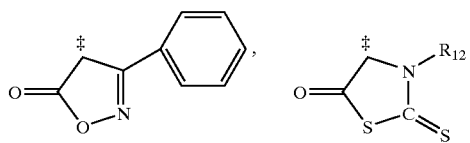

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

5. The composition of claim 4, wherein the co-polymer comprises a third repeating unit including a third moiety having plasticizing ability.

6. The composition of claim 5, wherein the third repeating unit including a third moiety having plasticizing ability is represented by the following structure:

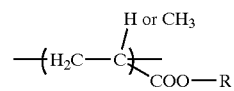

wherein R is selected from the group consisting of a linear alkyl group with up to 10 carbons, a linear alkenyl group with up to 10 carbons, a branched alkyl group with up to 10 carbons, and a branched alkenyl group with up to 10 carbons.

7. A composition comprising a block co-polymer, wherein:

(a) the block co-polymer comprises a first block unit including a first moiety selected from the group consisting of the structures (i), (ii) and (iii), and a second block unit including a second moiety represented by the formula (0); wherein (b) the composition exhibits photorefractive ability:

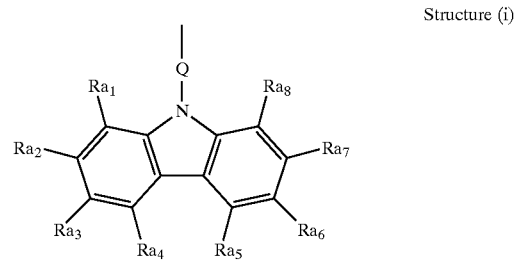

Structure (i)

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are each independently selected from the group consisting of a hydrogen atom, a linear alkyl group with up to 10 carbons, a branched alkyl group with up to 10 carbons, and an aromatic group with up to 10 carbons;

Structure (ii)

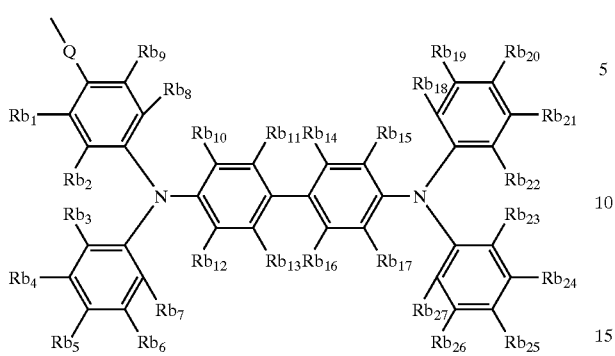

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)

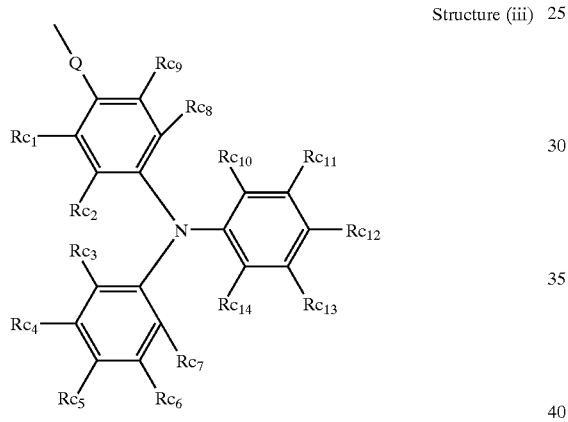

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

Formula (0)

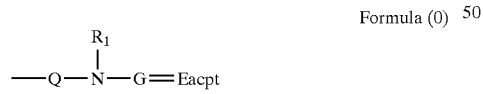

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group, wherein said G is represented by a structure selected from the group consisting of the structures (iv), (v) and (vi), with the proviso that when said first moiety is said structure (i) or (iii), said G is said structure (vi), wherein structures (iv), (v) and (vi) are:

Structure (iv)

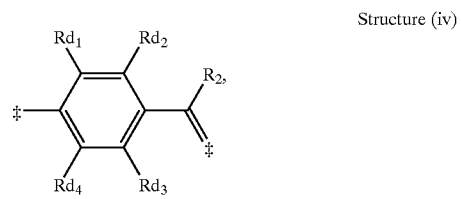

Structure (v)

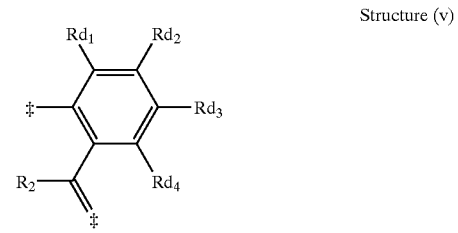

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

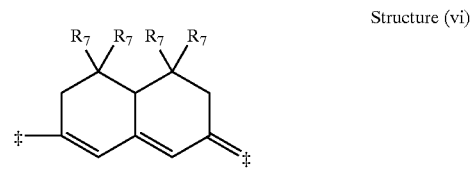

wherein $R_7$ represents a linear or branched alkyl group with up to 10 carbons; and
wherein Eacpt in formula (0) is an electron acceptor group and represented by a structure selected from the group consisting of the structures;

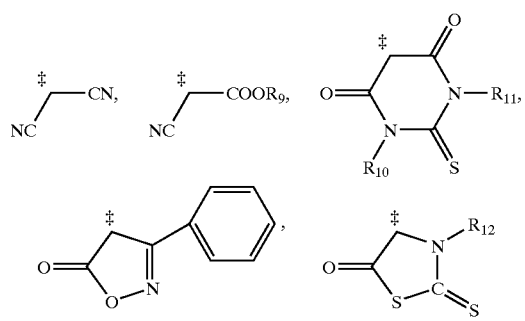

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

8. The composition of claim 7, wherein the block co-polymer comprises a third repeating block unit including a third moiety having plasticizing ability.

9. The composition of claim 8, wherein the third moiety having plasticizing ability is selected from the group consisting of a linear alkyl group with up to 10 carbons, a linear alkenyl group with up to 10 carbons, a branched alkyl group with up to 10 carbons, and a branched alkenyl group with up to 10 carbons.

10. A composition comprising a block co-polymer prepared by living radical polymerization, wherein:
(a) the block co-polymer comprises a first block unit having charge transport ability which comprises a unit selected from the group consisting of the structures (i)'', (ii)'' and (iii)'', and a second block unit having non-linear-optical ability which comprises a unit represented by the formula (0)''; wherein
(b) the composition exhibits photorefractive ability, Structure (i)''

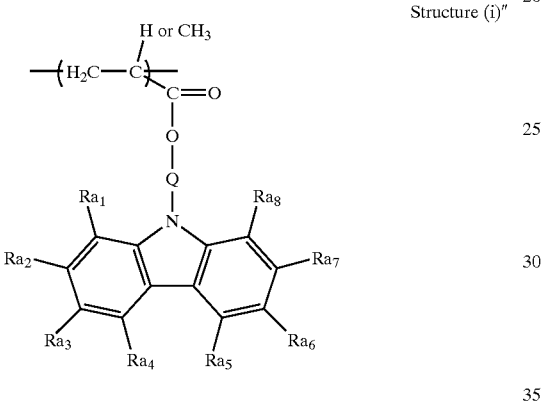

wherein O represents an alkylene group, with or without a hetero atom; $Ra_1$, $Ra_2$, $R_3$, $Ra_4$, $Ra_5$, $Ra_6$, $Ra_7$, and $Ra_8$ are each independently selected from the group consisting of a hydrogen atom, a linear alkyl group with up) to 10 carbons, a branched alkyl group with up to 10 carbons, and an aromatic group with up to 10 carbons;

Structure (ii)''

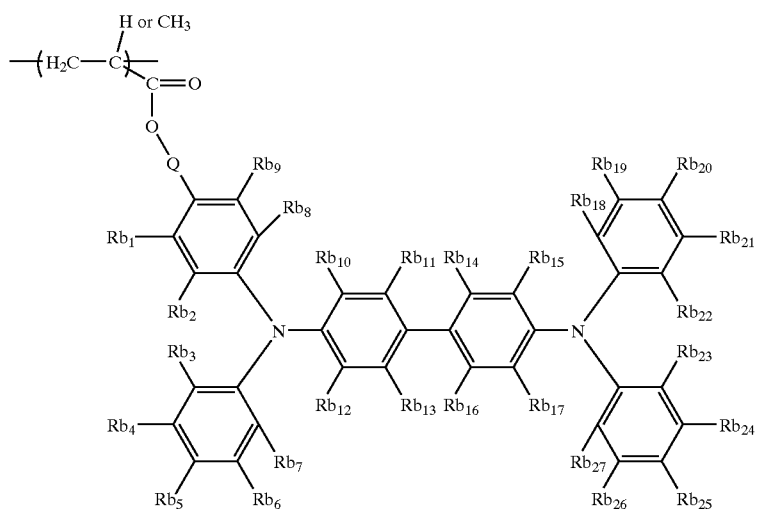

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)''

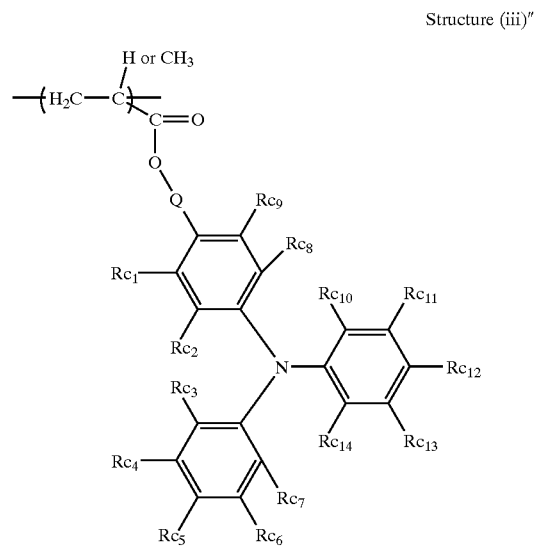

wherein Q represents an alkylene group, with or without a hetero atom; $Rc_1$–$RC_{14}$ are each independently selected from the group consisting of a hydrogen atom, a linear alkyl group with up to 10 carbons, a branched alkyl group with up to 10 carbons, and an aromatic group with up to 10 carbons;

Formula (0)''

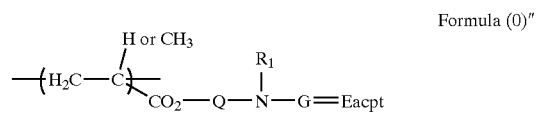

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group, wherein said G is represented by a structure selected from the group consisting of the structures (iv), (v) and (vi), with the proviso that when said unit constituting said first block unit is said structure (i)″ or (iii)″, said G is said structure (vi), wherein structures (iv), (v) and (vi) are:

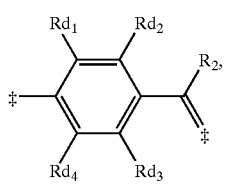

Structure (iv)

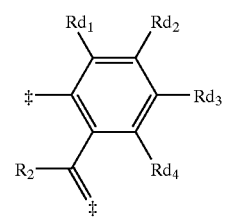

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

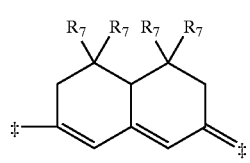

Structure (vi)

wherein $R_7$ represents a linear or branched alkyl group with up to 10 carbons; and wherein Eacpt in formula (0)″ is an electron acceptor group and represented by a structure selected from the group consisting of the structures;

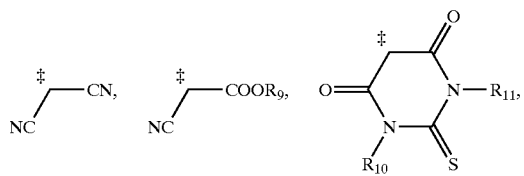

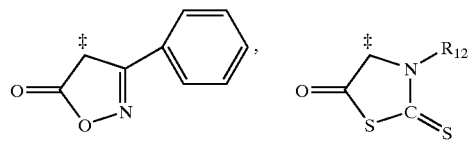

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

11. A composition comprising a block co-polymer, wherein:

(a) the block co-polymer comprises a first block unit containing a unit selected from the group consisting of the structures (i)″, (ii)″ and (iii)″, and a second block unit containing a unit represented by the formula (0)″; wherein (b) the composition exhibits photorefractive ability:

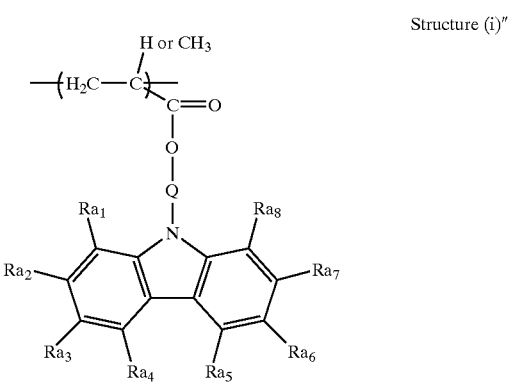

Structure (i)″ wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are each independently selected from the group consisting of a hydrogen atom, a linear alkyl group with up to 10 carbons, a branched alkyl group with up to 10 carbons, and an aromatic group with up to 10 carbons;

Structure (ii)″

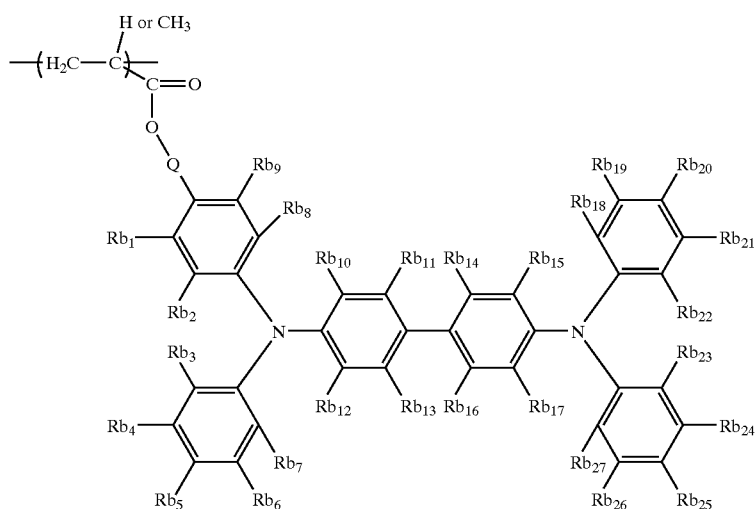

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)″

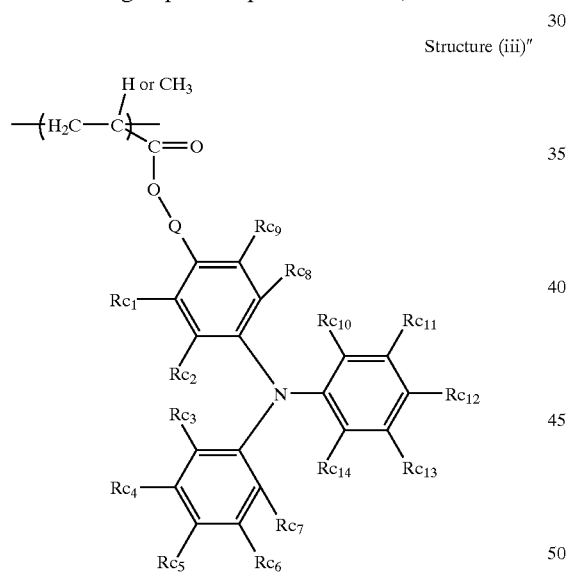

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

Formula (0)″

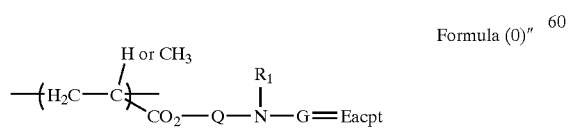

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor groups, wherein said G is represented by a structure selected from the group consisting of the structures (iv), (v) and (vi), with the proviso that when said unit constituting said first block unit is said structure (i)″ or (iii)″, said G is said structure (vi), wherein structures (iv), (v) and (vi) are:

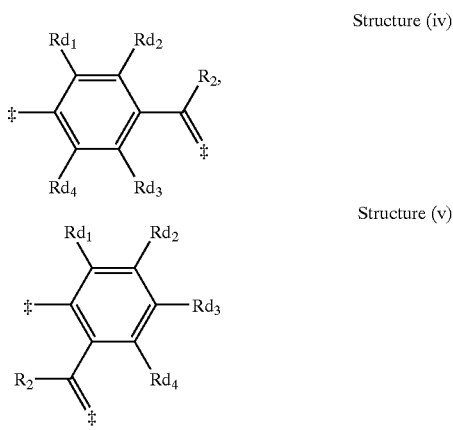

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

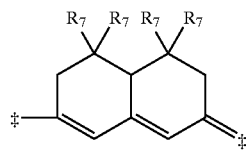

wherein $R_7$ represents a linear or branched alkyl group with up to 10 carbons; and wherein Eacpt in formula (0)" is an electron acceptor group and represented by a structure selected from the group consisting of the structures;

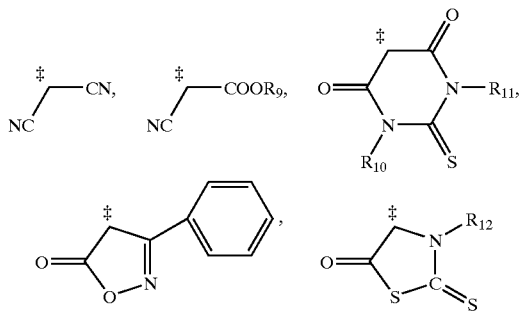

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

12. The composition of claim 11, wherein the block co-polymer comprises a third repeating unit including a third moiety having plasticizing ability.

13. The composition of claim 12, wherein the third repeating unit including a third moiety having plasticizing ability is represented by the following structure:

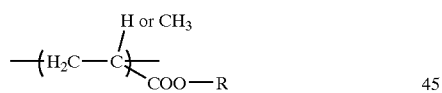

wherein R is selected from the group consisting of a linear alkyl group with up to 10 carbons, a linear alkenyl group with up to 10 carbons, a branched alkyl group with up to 10 carbons, and a branched alkenyl group with up to 10 carbons.

14. The composition of claim 1, further comprising a plasticizer and a sensitizer.

15. The composition of claim 4, further comprising a plasticizer and a sensitizer.

16. The composition of claim 7, further comprising a plasticizer and a sensitizer.

17. The composition of claim 10, further comprising a plasticizer and a sensitizer.

18. The composition of claim 11, further comprising a plasticizer and a sensitizer.

19. A composition comprising a co-polymer, wherein:
(a) the co-polymer comprises a first repeating unit including a first moiety represented by the structure (ii), and a second repeating unit including a second moiety represented by the formula (0); wherein
(b) the composition exhibits photorefractive ability:

Structure (ii)

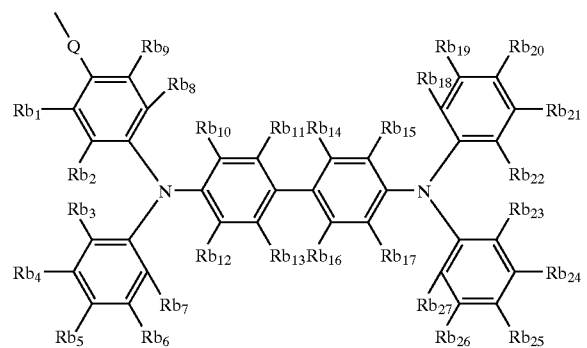

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Formula (0)

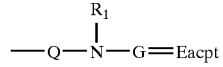

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

20. The composition of claim 19, wherein said G in said formula (0) is represented by the structure (iv):

Structure (iv)

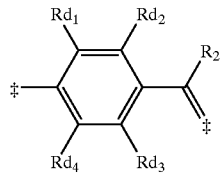

wherein, in structure (iv), $R_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons.

21. A composition comprising a co-polymer prepared by radical polymerization, wherein:
(a) the co-polymer comprises a first repeating unit represented by the structure (ii)", and a second repeating unit represented by the formula (0)"; wherein
(b) the composition exhibits photorefractive ability:

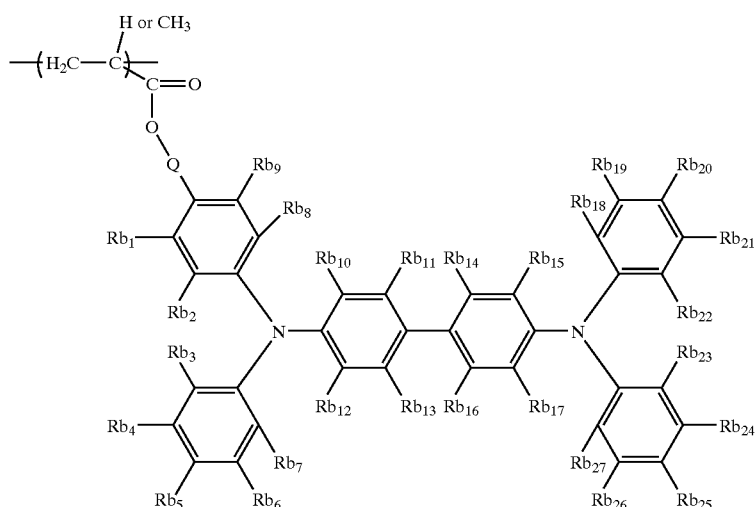

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Formula (0)″

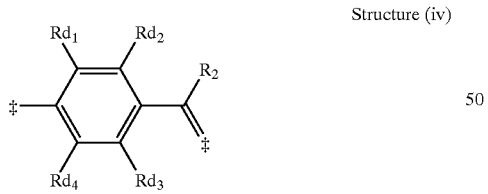

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

22. The composition of claim 21, wherein said G in said formula (0)″ is represented by the structure (iv):

Structure (iv)

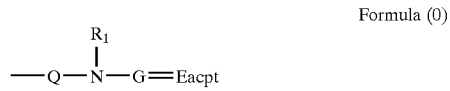

wherein, in structure (iv), $Rd_1$–$Rd_4$ are each independently, selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons.

23. A composition comprising a block co-polymer, wherein:
(a) the block co-polymer comprises a first block unit including a first moiety represented by the structure (ii), and a second block unit including a second moiety represented by the formula (0); wherein
(b) the composition exhibits photorefractive ability:

Structure (ii)

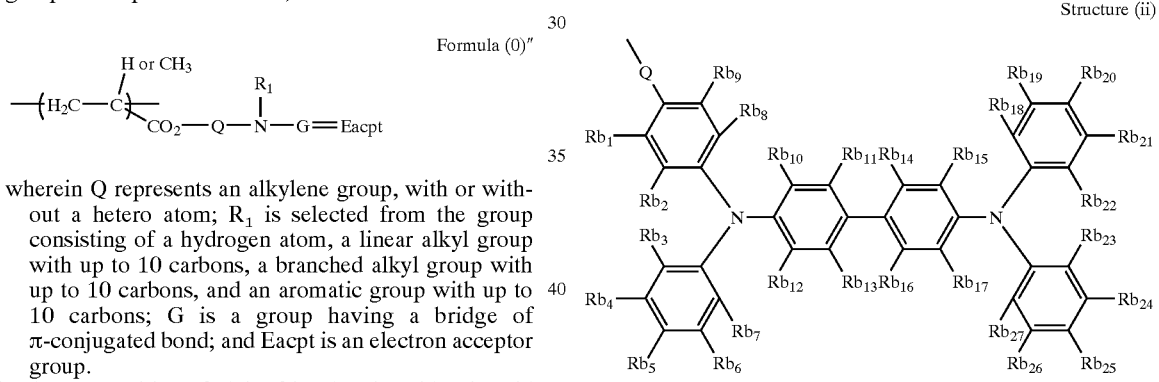

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Formula (0)

$$—Q—\underset{\underset{R_1}{|}}{N}—G=\text{Eacpt}$$

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

24. The composition of claim 23, wherein said G in said formula (0) is represented by the structure (iv):

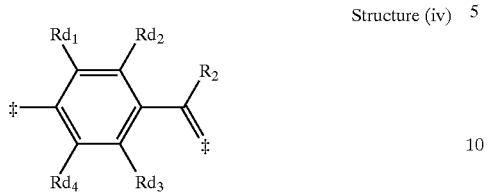

Structure (iv)

wherein, in structure (iv), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons.

25. A composition comprising a block co-polymer prepared by living radical polymerization, wherein:
(a) the block co-polymer comprises a first block unit having charge transport ability which comprises a unit represented by the structure (ii)", and a second block unit having non-linear-optical ability which comprises a unit represented by the formula (0)"; wherein
(b) the composition exhibits photorefractive ability,

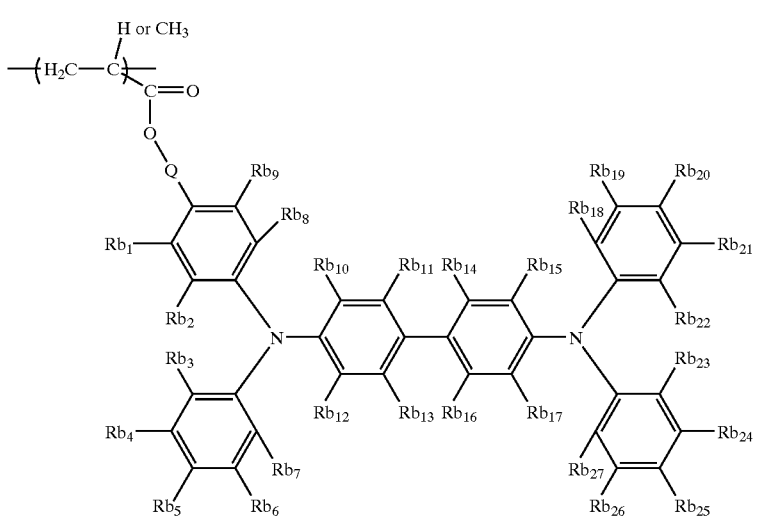

Structure (ii)"

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

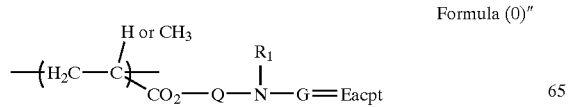

Formula (0)"

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

26. The composition of claim 25, wherein said G in said formula (0)" is represented by the structure (iv):

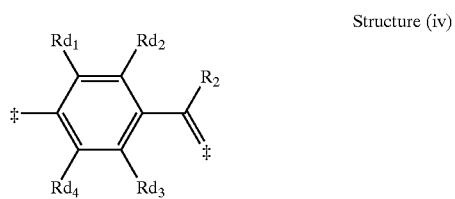

Structure (iv)

wherein, in structure (iv), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons.

27. A composition comprising a block co-polymer, wherein:
(a) the block co-polymer comprises a first block unit containing a unit represented by the structure (ii)", and a second block unit containing a unit represented by the formula (0)"; wherein
(b) the composition exhibits photorefractive ability:

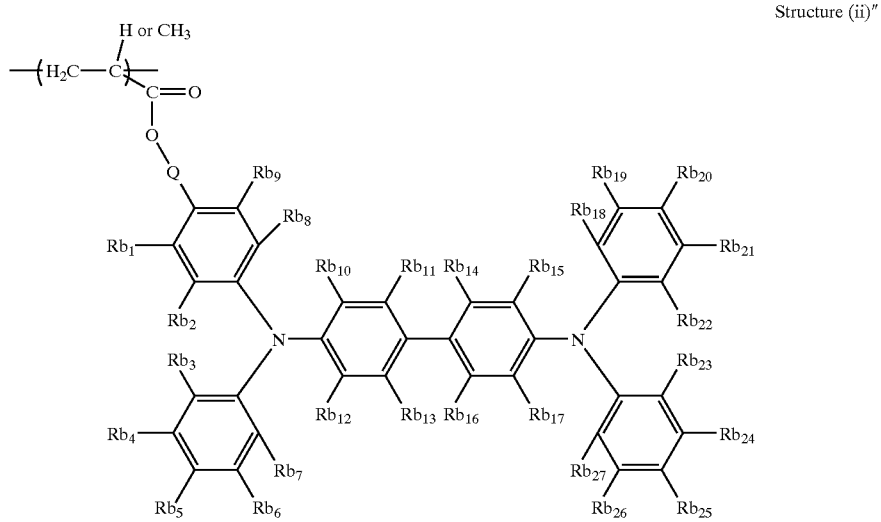

Structure (ii)″ wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

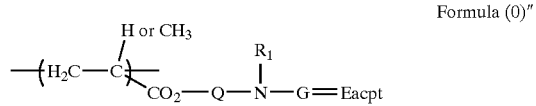

Formula (0)″ wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

28. The composition of claim 27, wherein said G in said formula (0)″ is represented by the structure (iv):

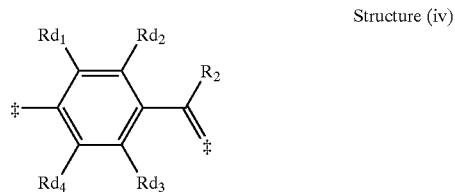

Structure (iv)

wherein, in structure (iv), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons.

* * * * *